United States Patent [19]

Masson

[11] 4,396,148

[45] Aug. 2, 1983

[54] HEATING SYSTEM CONTROL DEVICE

[75] Inventor: Vijay Masson, Forest Hills, N.Y.

[73] Assignee: Heat-Timer Corporation, Fairfield, N.J.

[21] Appl. No.: 314,238

[22] Filed: Oct. 23, 1981

[51] Int. Cl.³ .............................. F24D 3/00; F23N 5/20
[52] U.S. Cl. ................................ 237/8 R; 236/46 R; 236/91 R
[58] Field of Search .................. 236/46 R, 46 F, 91 F, 236/91 G, 91 R; 237/8 R

[56] References Cited

U.S. PATENT DOCUMENTS 2,574,383 11/1951 Gaddis .......................... 236/46 F Primary Examiner—William E. Wayner Attorney, Agent, or Firm—McAulay, Fields, Fisher, Goldstein & Nissen

[57] ABSTRACT

A heating system control device is responsive to the drop in outside temperature to below a predetermined weatherhead set point for turning on a heating system to be controlled. Upon the establishment of the heat in the heating system, a defined heating cycle is carried out consisting of a heat-on portion and a heat-off portion having a duty cycle dependent on the outside temperature. The heating cycle does not start until there is an establishment of heat in the heating system. The start of consecutive heating cycles is delayed in response to a check for heat loss in the system. When heat is established and the set point has not been reached, as noted by the means for determining the establishment of heat in the heating system, the next cycle will be delayed to save energy.

15 Claims, 6 Drawing Figures

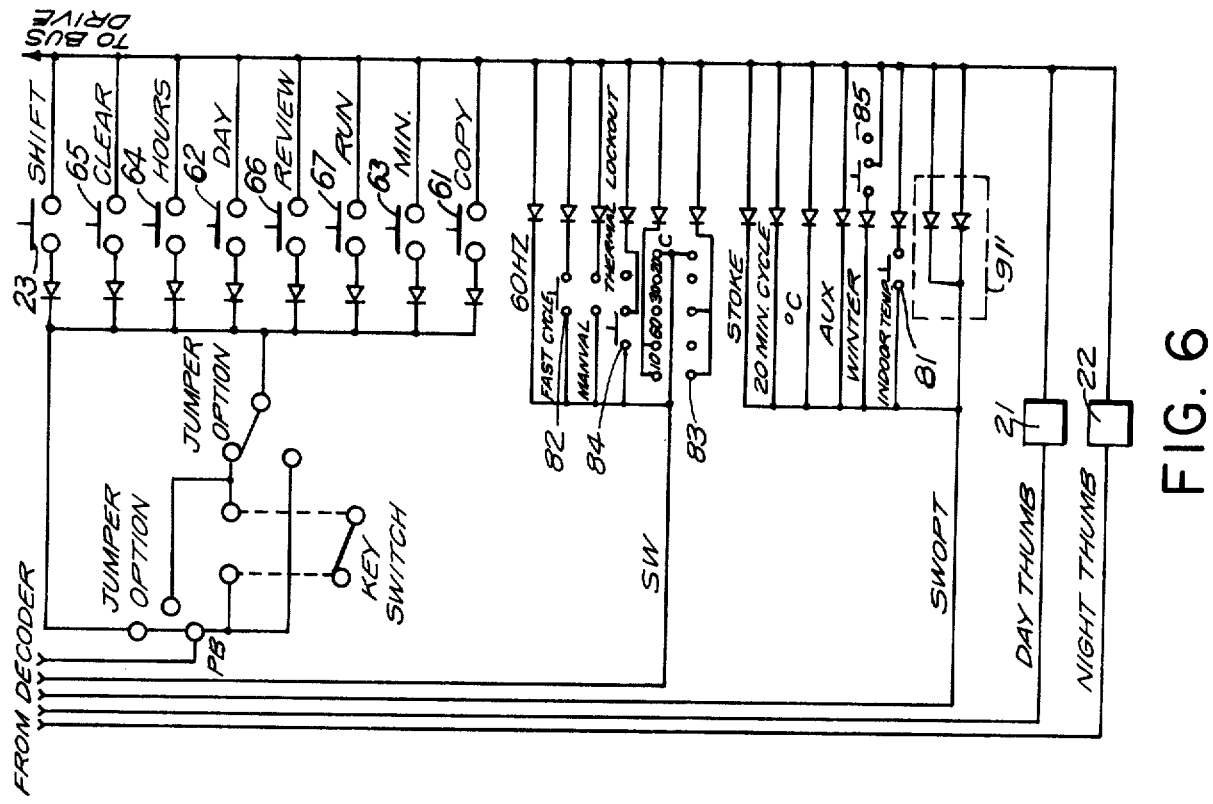
FIG. 6
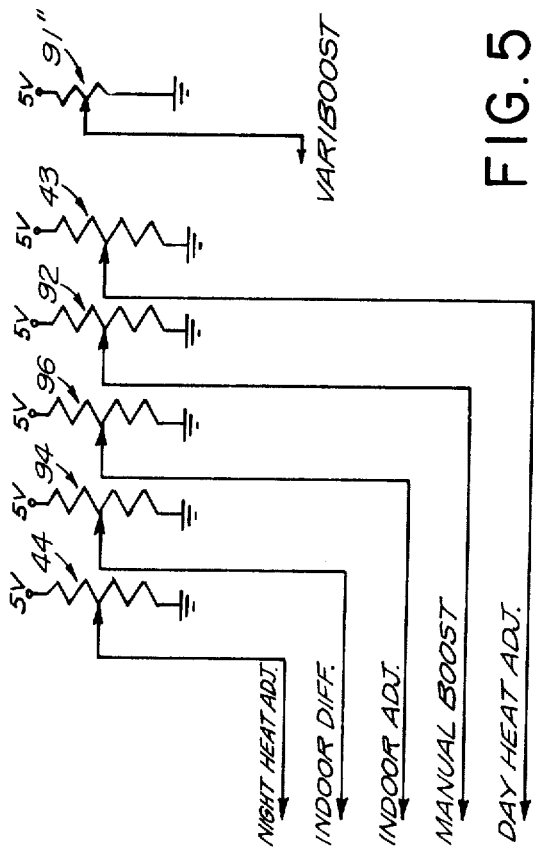
FIG. 5
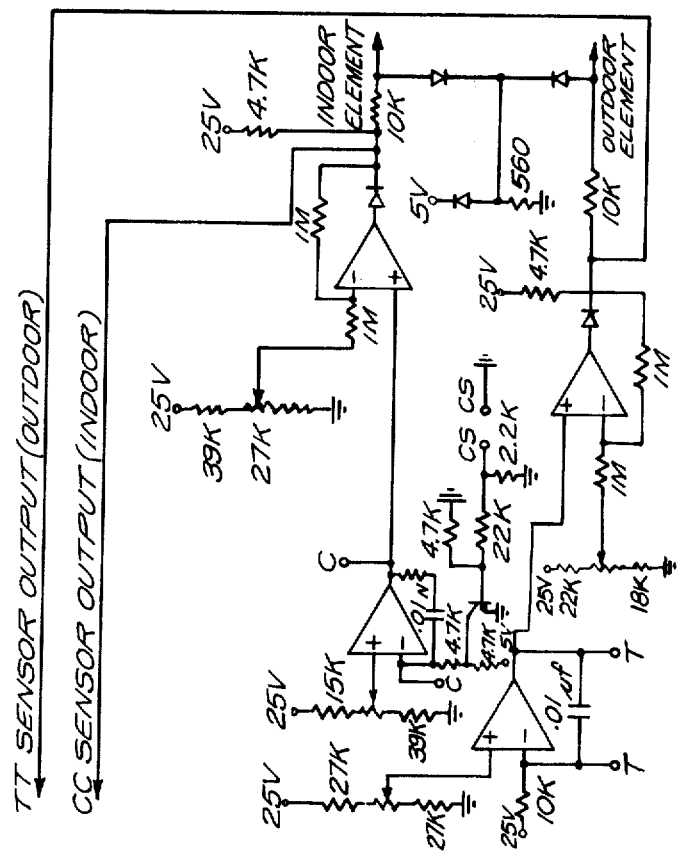

HEATING SYSTEM CONTROL DEVICE

BACKGROUND OF THE INVENTION

The present invention relates to a heating system control device and in particular to an electronic control device which is programmable by the user.

While heating system control devices are known in the art, such conventional devices have very little flexibility and thus offer little adjustment of the control of a heating system. The ability to adjust various parameters in the heating system has taken on new importance with the considerable increase in heating fuel costs.

In conventional control devices, the heating cycle time was controlled by a heating cycle motor and a change in the heating cycle necessitated a change in the motor itself. Moreover, conventional devices had difficulty in accommodating the 24 hour clock thereof to a seven day clock without substantial changes in circuitry.

Further, standard off-the-shelf systems were not adaptable to different buildings and thus each device would have to be fitted with customized parts such as motors for particular applications.

Other disadvantages of the conventional systems were that they could not reduce the duty cycle of the heating cycle below certain mechanical limits defined by the elements used therein and thus the systems would generate too much heat in the spring and in the fall.

Furthermore, with the desire to save as much money as possible with heating and thus keeping buildings cold at night, conventional systems had difficulty in adapting to the initial warm-up period in the morning and thus buildings remain cold even during the early morning working hours.

SUMMARY OF THE INVENTION

The main object of the present invention is to provide a heating system control device which is capable of being adaptable to any heating requirements of a building without the addition of new circuitry or different circuitry and which is easy to operate and which overcomes the disadvantages of the prior art devices as set forth hereinabove.

Another object of the present invention is to provide a heating system control device which allows for a morning boost in the heating system to enable the heating system to be at a low temperature during the evening hours but still adequately warm the building in the early morning for the start of working hours.

Another object of the present invention is to provide a thermal lock-out which ensures that no heat will be supplied to the building regardless of the outdoor temperature in order to save on heating.

Another object of the present invention is to provide a completely solid state device which operates automatically to control a heating system.

These and other objects of the present invention are provided by the heating system control device according to the present invention which includes means responsive to the dropping of the outside temperature to below a predetermined weatherhead set point for turning on a heating system, means for determining the establishment of heat in a heating system, means defining a heating cycle consisting of a heat on portion and a heat on portion having a duty cycle dependent on the outside temperature and starting in response to the establishment of heat in the heating system and means for checking for heat loss in the system under control and for delaying the start-up of new heating cycle when heat is established until more heat is needed.

In accordance with the present invention, the heating control device has a microprocessor heating control circuit which is designed to control a building's heating system effectively and economically producing a smooth flow of heat when and where it is needed and to the degree it is desired.

The device is capable of reducing temperature levels when not needed and by eliminating high peaks of uncontrollable surges and heat to effect substantial energy savings. The device can be programmed for carrying out complex computations automatically and the controls for the device are simple switches and knobs and the display elements therefor include a digital display and function lights.

These and other objects and advantages of the present invention will become clear from the detailed description of the present invention and in accordance with the drawings wherein:

BRIEF DESCRIPTION OF THE DRAWINGS

FIG. 5 is a detailed schematic circuitry for the sensor inputs and control settings of FIG. 4; and FIG. 6 is a detail of the circuitry for the control panel switch inputs of FIG. 4.

DETAILED DESCRIPTION OF THE INVENTION

Figure 1:
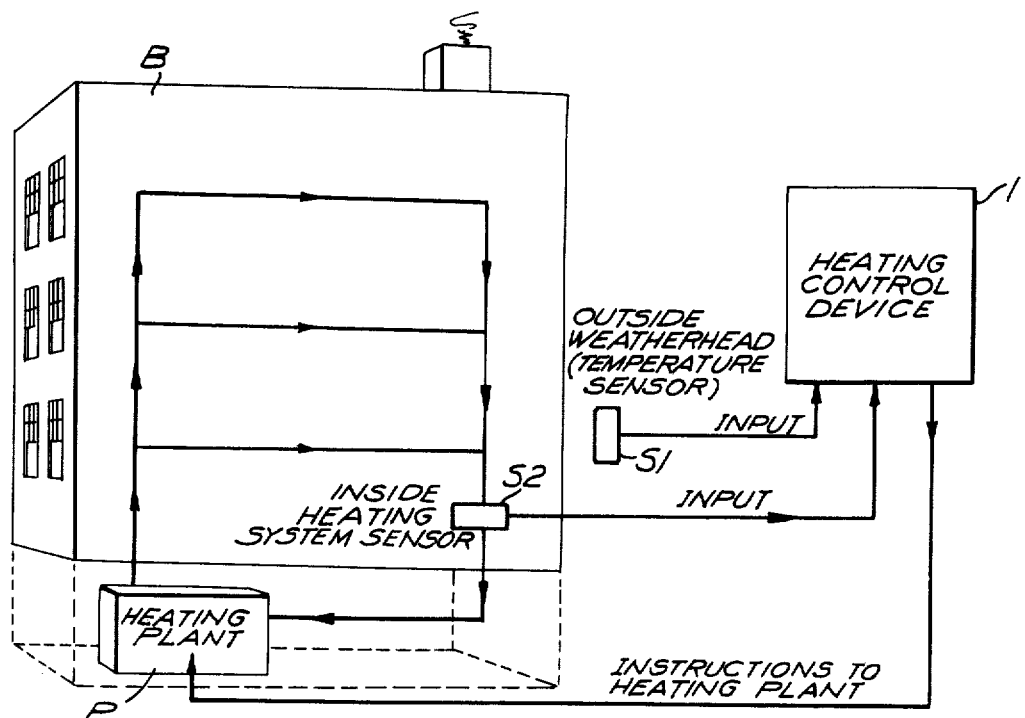
FIG. 1 is a schematic representation of the heating control device and its connection to a heating system in accordance with the invention.

FIG. 1 shows a schematic of the connection of the heating control device 1 of the present invention to a heating system which includes a building B, a heating plant P within building B and a sensor S1 for sensing the outside weatherhead temperature and a sensor S2 for sensing the indoor heating temperature. The control device directly feeds to the heating plant P to control same as will be explained hereinafter.

The device 1 continuously monitors the outside temperature by means of sensor S1 and at the same time monitors the heat loss of the building by means of the inside temperature sensor S2 located on a return line of the heating system inside the building. On the basis of the combined information, the device 1 sends instructions to the heating plant P as will be explained.

The control of the heating plant P is basically by turning the heating plant on and off. The device tells the heating plant by means of an electrical signal when to go on and how long to stay on and when to go off and how long to stay off. Basically, the device controls the heating plant in accordance with heating cycles, by controlling the duty cycle of each cycle, the frequency of the cycle and the delay between cycles.

A cycle is a set time period, such as 60 minutes, and consists of a heat-on part followed by a heat-off part, both parts always adding up to exactly the predetermined set time period (i.e. 60 minutes).

The length (or duty cycle) of the on part when heat is produced, is controlled by means which varies this length in dependence on a number of factors. For example, the lower the outside temperature, the longer the on part in relation to the off part. The ratio between the two is also controlled by the selection of weatherhead set points compared to the outside temperature sensed by sensor S1.

Another factor that is sensed by the device according to the present invention is the heat loss of the heating plant P. The heat loss which is measured by inside heating sensor S2, determines whether cycles will follow each other without delay or with some delay. The device automatically monitors the heat loss in the building as reflected by the return pipe temperature to see if heat is still established at the end of the cycle. The so-called establishment of heat in the system is defined as a predetermined return pipe temperature which shows that heat has spread through the entire radiation system of the building.

If heat is still established at the end of the cycle, the device reacts to this by effecting a delay between successive cycles thus delaying the next on time for the heating plant.

The device also has the capability of establishing two general system heating levels, one defined as normal which is traditionally set during the daytime and is relatively higher and the other defined as a saving level which is traditionally set at nighttime and is a lower heating level that saves energy when a building is vacant or the people therewithin are usually asleep.

Figure 3:
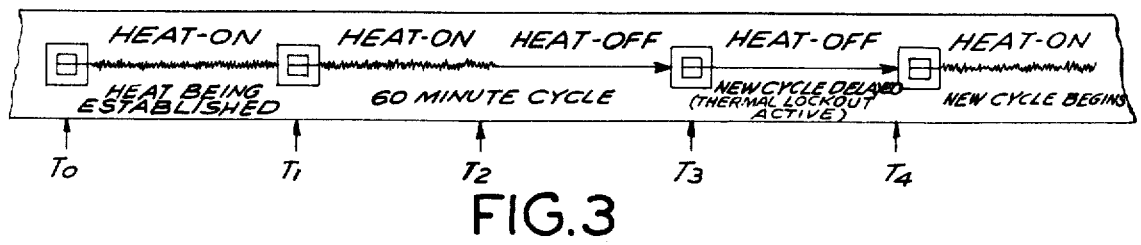
FIG. 3 is a timing diagram showing the operational timing of the heating system controlled in accordance with the present invention.

The device according to the present invention controls the building heating system, as shown in FIG. 3, by first turning on the heating plant P at time T0 to effect an establishment of heat. When the sensor S2 indicates that heat is established within the building B, time T1 is reached wherein the normal heating cycle, for example 60 minutes is established with the duty cycle thereof determined by the outside temperature sensed by sensor S1. When the heating cycle terminates at time T3, if heat is still established within the building as indicated by sensor S2 and if the sensor S2 shows that heat is not needed yet, a thermal lock-out will be effected wherein the next heating cycle is delayed until time T4 when sensor S2 indicates that heat is needed. At this point, the normal heating cycle will again begin.

The system control circuitry for carrying out the above is shown in more detail with respect to FIGS. 2 and 4-6 as will be explained hereinafter.

Figure 2:
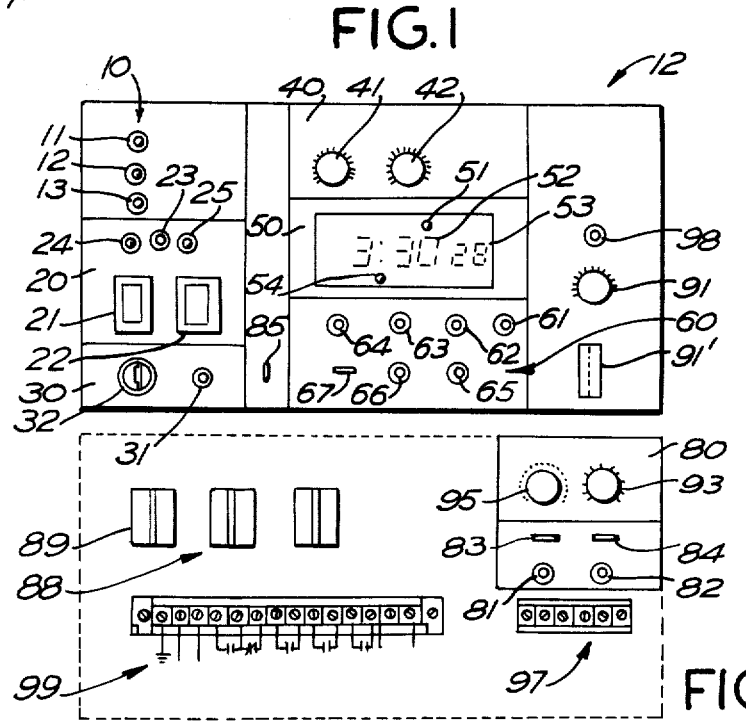
FIG. 2 is a front view of the control panel for the device according to the invention.

With regard to FIG. 2, the control of the functions of the device will be explained as will the operation of the device in accordance with the invention.

The front panel of the device according to the present invention includes a plurality of switches and display elements for programming the device to automatically carry out heating plant control instructions day after day and for 24 hours every day.

The display panel 2 includes heat adjustment controls 40 for raising or lowering the buildings general heat level. Included in this control is knob 41 which sets the normal or conventionally daytime heat level setting and knob 42 which sets the save or conventionally nighttime heat level. These knobs control potentiometers 43 and 44 respectively shown in FIG. 5 and which constitute two of the output signals of the circuit block 180 shown in FIG. 4.

The two heat levels are set on an alphabetical scale from A-P with the lowest point being A and the highest point being P. For each adjustment upward on the heat on part of the cycle, there is a slight increase in the duration of the duty cycle. This adjustment affects a fine tuning of the heating cycle since other factors also influence the heat levels. The setting of knobs 41 and 42 is determined primarily by the heat loss characteristics of the building.

The weatherhead set points for both the normal and save periods for a given day are set in section 20 of the control panel including thumb switches 21 and 22 which set the weather head set point temperatures for the normal and save conditions respectively.

If as shown the normal weather head set point is set for 50° and the save set point is set for 42°, the heating system will not go on unless the outside temperature is at or below 50° during the normal periods during the day and at or below 42° when during the save periods. The status of the system is indicated by lights 24 and 25 which indicate that the normal or save periods respectively are in effect at any given time. The control lights 24 and 25 are included in the control lights and relay block 152 in FIG. 4.

The system also has the ability to manually shift from the save period level to the normal period level by use of the shift push button 23. In response to the actuation of push button 23, the device will shift from the save to the normal level for a given period of time (i.e. 90 minutes) and then revert back to the save period if the program calls for the save temperature level at that time.

Section 30 of the control panel includes the auto by-pass push button 31 and the key switch 32 for enabling the device to be programmed as will be explained hereinafter. The by-pass push button 31 enables the entire device to be by-passed so that the heating system is in the constant on condition. The program lock switch 32 merely prevents the device programming to be changed when in the locked position as will be explained hereinafter.

The device operates with two heat levels, the higher heat level normally scheduled for when people are up and about, is called the normal level and the lower one called the save level is for when people are asleep or the building is unoccupied. The two heat levels can be changed alternately from one to the other up to 8 times a day as programmed into the device and each of the seven days of the week can be programmed differently as will be explained.

The programming of the period times is set in sections 50 and 60 of the control panel 2. In section 60, switches 61–67 control the programming of the device as is indicated by the display in secton 50 including display elements 51–54.

Switch 67, when pushed from the run to the program position, changes the display section 50 from a display of the current time/temperature to the programmed data. The program mode is effected by the opening of key switch 32 and switch 67 at run and then the minute switch is depressed and the display will cycle from 1 through 59 until the button is released. Thereafter the hour display button 64 is depressed to set the particular hour desired for the day set in the display. The display 51 first displays the first normal period to be set and then the first save period to be set. If more than one normal period is to be utilized in a 24 hour day, the pressing of the advance button 66 will advance the display to be programmed into the second normal and second save periods. The pressing of the erase button 65 will erase the current pair of normal and save settings.

After the day has been completed, the day button 62 is depressed and it switches to the next day. If one desires to have the same timing for each day, the day copy button 61 can be pressed which merely copies the program from the previous day into the day now displayed. The clock is programmed for the entire week in this manner. At the end of the program, the switch 67 remains in the run position and the key switch 32 is placed in the locked position.

Light 51 indicates the day of the week in the display section 50 and light 54 illustrates whether the time being displayed on section 52 is AM or PM. Display 53 illustrates the outside temperature when the unit is in the run state as indicated by switch 67.

The display also includes section 10 including lights 11-13 which indicate the status of the heating plant. When light 11 is on, this means that the heat plant is on and the heat is being established therein. When lights 11-13 are all on, this means that heat is established and the cycle is in the on phase. When the lamps 12 and 13 are on, this means that the system is in the off phase of the cycle. When the lamp 13 is on alone, this is the off phase of the cycle and the heat is no longer established. When only light 12 is on, this means that the system is in the thermal lock-out phase.

Another function of the control device according to the invention is the addition of the morning boost control knob 91 which controls potentiometer 92 shown in FIG. 5 for establishing a so-called morning boost.

The morning boost control is an early morning surge of heat needed to overcome low nighttime temperatures. By setting knob 91 to the desired morning boost time of from 0 to 120 minutes, the heating plant will be turned on for the morning boost time set by knob 91 during the first normal cycle during a given 24 hour day. Thus if the morning boost knob 91 is set for 90 minutes, the heat will go on for the full 90 minutes regardless of the establishment of heat and the cycle time set for the heating cycle. This morning boost will start at the first normal heat level period of the day. Light 98 indicates that the control device is in the morning boost mode.

Another feature of the morning boost control is an automatic boost wherein, utilizing the circuitry shown in FIG. 5 and indicated as 91' and by setting knob 91'', the morning boost will be completely automatic in adjusting its time span each day to the outside temperature without any operator attention.

The variable boost works in a way which is similar to the manual version, except that it is not preset to a specific time period. It times its duration each day based on the outside temperature and it does this automatically, the higher the outside temperature, the shorter the morning boost.

It also times the morning boost to start far enough in advance so that heat is established at whatever time the operator sets the first day setting on the clock.

For example, if heat is to be established at 7:00 AM, the device will interrogate the weatherhead for the outside temperature three hours in advance, which in this case would be 4:00 AM and automatically calculates on the basis of the outside temperature, at which time the heat source must go on to reach an established temperature by 7:00 AM.

Although the automatic morning boost is self sufficient in operation, there is a one time adjustment to make at the outset on potentiometer 91'' to compensate for the specific characteristics of the buildings heating system. A module containing the circuitry 91' and 91'' makes it possible to achieve an infinite number of variable settings, which based upon experience for a particular building, will enable one to choose the best setting for the building. Once the optimum setting is found, it can be left there and the entire process will hence forth be automatic.

The automatic variable boost circuitry can also be used to effect an automatic early shutdown of the heating system. Utilizing the same circuitry, the device can automatically shutdown the heating system in advance of the last night-time heat level so that the heating system can "coast" to its night-time level. For example, if the low night-time heat level is scheduled to start at 11:00 PM, the automatic shut-down will turn off the system at an earlier time depending upon the outside temperature. Thus the heating system may turn off at 10:00 PM in anticipation of the fact that the low night-time heat level begins at 11:00 PM and the outside temperature is at a particular level which warrants such an anticipated shut-down.

Control section 80 includes switches and settings for adapting the control device to the buildings heat loss.

The slide switch 83 provides a choice of four cycle times, 20, 30, 60 or 90 minutes. The optimum cycle time for a building is determined by the kind of heating system and the type of radiation. Where the radiation system looses heat fast, a shorter cycle time is called for, while the system whose radiation holds heat longer, calls for a longer cycle time.

The set point for the return pipe sensor S2 is determined by control knob 95 which controls potentiometer 96 as shown in FIG. 5. Since the sensor S2 at the return pipe inside the building B is positioned where steam and water return to the boiler after moving through the buildings heating system, it reflects the heat loss of the building. It also determines when heat is considered established in the building that is when heat has permeated the entire building.

Since there are so many variables involved in establishing heat circulation in the building, the set point for the sensor is best fixed by trial and error.

The system sensors set point is set by allowing the radiation in the building to be near room temperature, setting the knob 95 to position Z, turning the heating system on, waiting for radiation at the farthest point from the boiler along the return pipe to become warm and then slowly turing the knob 95 until status light 12 goes on. This is the optimum setting for establishing heat in the building.

The thermal lock-out or delay between cycles is controlled by switches 83 and 84 as will be explained. At the end of a cycle, a new one starts at once if heat is still established. However, if there is heat already in the building it is not necessary to start a new cycle immediately since this acts to merely waste heat. The thermal lock-out switch 84 when positioned in the off cycle operates the device in a normal continuous cycle mode. When placed in the on position, the device will automatically prevent the new cycle from starting if heat is still established in the building and is above the set point. When the return pipe cools to the set point, only then can a new cycle begin.

Control knob 93 which controls potentiometer 94 shown in FIG. 5, provides an electronic differential to further adjust the onset of new cycles in the thermal lock-out mode. The knob 93 adjusts the device so that the new cycle will be delayed until the return pipe temperature reaches as much as 50° below the set point. For example if the return pipe sensor is set at 180° F. and the differential is set at −25°, the new cycle will not start until the sensor at the return pipe drops to 155° F. This mode is most useful where the return pipe temperature at the heating system sensor S2 drops faster than the radiation temperatures in the building.

Other advantageous features of the device according to the present invention will now be explained.

In order to find out the actual temperature of the heating system, if one presses the button 81 the output of sensor S2 will appear in display 53 instead of the outside temperature from sensor S1. Since the display 54 is only capable of displaying two digits, the displayed inside temperature is shown divided by 3.

This display is particularly useful when the system is in the process of being established, since one can see the exact temperature at which the sensor establishes heat during operation.

Switch 82 is provided for effecting a fast cycle that changes the minutes of the electronic clock into seconds to that the cycle can be reviewed swiftly. A 60 minute cycle can be reviewed in 60 seconds on the display. By depressing the button 82, continuously, the display will show in one minute the exact duration of the heat-on and heat-off segments of the cycle for a 60 minute cycle. This information can be used to calibrate the device for a particular weatherhead set point to see if the device is operating properly.

The switch 85 simply turns off the control for a non-heating season. When the cold weather ends the switch is put on the off position and while in the off position the control will continue to display the outside temperature and the current time, although the heating plant will not be turned on.

The device according to the invention also includes the terminal strip 97 which has the inputs TT for the sensor S1 and inputs CC for sensor S2. The inputs CS-CS are for reverse polarity sensors. Terminal strip 99 is an output terminal for providing power for optional items. Along with terminal 99 are relays 88 and 89 for optional controls.

Figure 4:
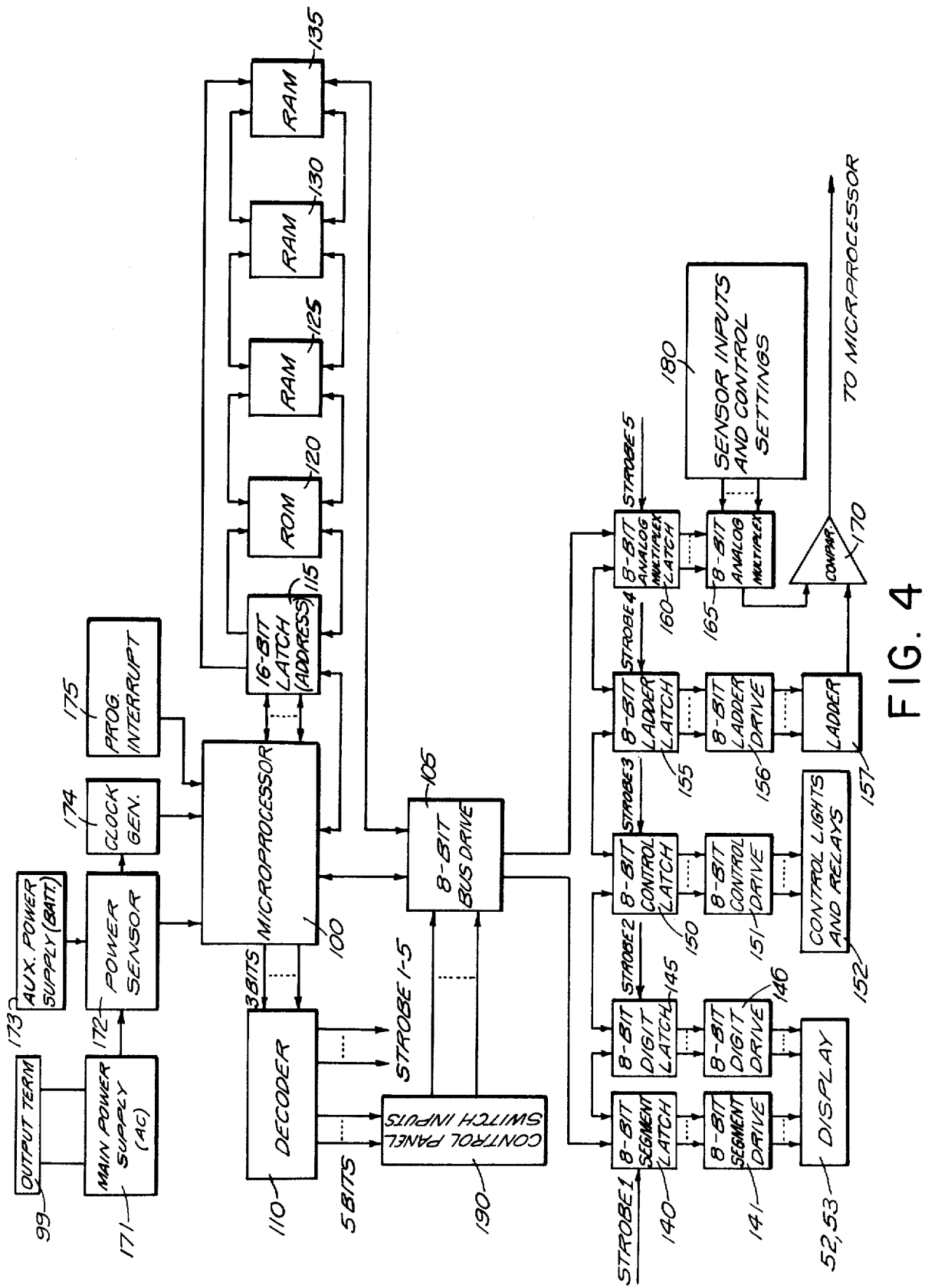
FIG. 4 is a block diagram of the circuit of the device according to the present invention.

Referring now to FIGS. 4-6, the circuitry for effecting the functions set forth hereinabove are disclosed in more detail.

The device is powered by a main power supply 171 which receives a line voltage from an AC source. The output of the main power supply 171 is fed to a power sensor 172 which feeds microprocessor 100, clock generator 174 and all of the other circuitry included in the device. The power sensor senses if the power supply 171 is operational, and if not, it cuts in auxiliary battery power supply 173 so that the circuitry does not go down during the loss of the AC supply. The clock generator 174 generates the clock signals necessary to operate the system according to its specification. Also included is a program interrupt 175 which enables the system to be interrupted during use for servicing and the like.

The main control network of the device according to the present invention is the microprocessor 100 connected in a conventional configuration with an 8-bit bus driver 115 and in communication with a 16-bit latch address network 115 a ROM 120 and 3 RAM memories 125, 130 and 135 connected as shown. The microprocessor 100 feeds three control bits to decoder 110 which, on the basis of these bits, outputs 5 interrogation signals TB, SW, SWOPT, Day Thumb and Night Thumb, as shown in FIG. 5 to interrogate the status of the control panel switch inputs heretofore described. The decoder also generates five strobe signals strobe 1-5 which are used to direct the storage of data from the bus drive 105 to latches 140, 145, 150, 155 and 160.

The data on the bus which is controlled by microprocessor 100 is displayed as follows:

The 8-bit segment latch 140 received data from the data bus and upon the strobing by strobe 1, the data is stored in the latch 140. The digit data is supplied via the bus drive 105 to 8-bit digit latch 145 which data is entered therein by strobe 2. Upon the strobing of data into latches 140 and 145, the segment and digit drives 141 and 146 feed display 52, 53 to display the data therein.

The other control lights and relays are displayed and controlled via the 8-bit control latch 150 whose data is strobed in by strobe 3 and driven by control drive 151 so as to be indicated by the control lights and relays 152.

The determination of the levels and control settings shown in FIG. 5 and illustrated in FIG. 4 as block 180, are analyzed by the microprocessor by means of the analog multiplex latch 160 which stores 3 bits of data to select one of eight inputs on analog multiplexor 165 which is fed by the sensor inputs and control settings 180. Multiplexor 165 selects one of eight signals and inputs it to comparator 170. The microprocessor then determines the level of the data by incrementing the 8-bit ladder latch 155 via strobe 4 and driving the output thereof through drive 156 to a ladder network 157. The ladder network 157 generates a stepwise ladder which is fed into the comparator and which is fed back to the microprocessor when a favorable comparison is made thus indicating to the comparator that the data in the 8-bit ladder latch 155 is equal to the sensor input or control setting then under construction. The circuitry shown in FIG. 5 is conventional and provides for a processing of the sensor signals for use by the analog multiplexor.

FIG. 6 shows the block 190 which receives the interrogation outputs from decoder 110 which feeds the status of the switches and control panel settings to the bus drive for processing by the microprocessor 100.

In a particularly advantageous embodiment, the microprocessor 100 is an RCA 1802 microprocessor and the bus drive 105 comprises a TI 374 latch drive units. The latch 115 for the address is a TI 374 latch as are latches 140, 145, 150, 155 and 160. The ROM 120 is an AMI 9332 while RAM 125 is an RCA 1824 and RAMS 130 and 135 are AMI 5101 circuits.

The segment drive 141 is a Sprague 2800 as is control drive 151, while the digit drive 146 is a Sprague 2480. The ladder drive 156 is an RCA CD 4050 and the analog multiplexor 165 is an RCA 4051. The analog multiplex latch 160 is a 174 and the decoder 110 is a TI 7442. The comparator is a conventional operational amplifier in the most advantageous embodiment.

The device also includes stoking means for turning on the heating system to be controlled for a predetermined time each day regardless of outside temperature. It incluudes the stoke input shown in FIG. 6 in conjunction with the microprocessor instructions labeled "stoke" in the foregoing microprocessor program.

The microprocessor program for carrying out the aforementioned functions is set forth in the following printout listing thereof and it will be immediately recognizable by those skilled in the art that the entire operation of the device as set forth above can be achieved as a result of this step-by-step execution.

```
10      EQU     T4HR,&H20
20      EQU     ONE,&HF3
30      EQU     COAL,&H80
40      EQU     AUXSET,&H10
50      EQU     CEL,&H20
60      EQU     INT,&H1
70      EQU     RAM,&H3000
80      EQU     STON,&H30ED
90      EQU     STIM,&H30F1
100     EQU     SP,&H2
110     EQU     PC,&H3
120     EQU     SUB,&H4
130     EQU     SUBSUB,5
140     EQU     DISPNT,&HF
150     EQU     UTILP1,&HE
160     EQU     HZCNTR,&HD
170     EQU     TEMP,&H0
180     EQU     UTIL,&HB
190     EQU     UTILP2,&HA
200     EQU     CRAM,&HA000
210     EQU     STACK,&HA018
220     EQU     OUTMSK,&H3A
230     EQU     CONTR,6
240     EQU     DISPL,6
250     EQU     SEGPT,2
260     EQU     DISP,&HA005
270     EQU     HZMSK,&H80
280     EQU     NHZMSK,&H7F
290     EQU     BMSK,&H40
300     EQU     BUTMR,6
310     EQU     SYNC,&HB
320     EQU     FLAG,7
330     EQU     H1.5H,&HC
340     EQU     NBMSK,&HBF
350     EQU     SW,6
360     EQU     HZ,&H20
370     EQU     CYCTMR,8
380     EQU     RPDMSK,&H10
390     EQU     NBRMSK,&HEF
400     EQU     BSTMR,&HC
410     EQU     DNF,1
420     EQU     NDNF,&HFE
430     EQU     DNFC,2
440     EQU     NDNFC,&HFD
450     EQU     NDNFIC,&HFC
460     EQU     TIME,&H30E0
470     EQU     DNFIC,3
480     EQU     AUTMSK,2
490     EQU     MANBST,&HF7
500     EQU     SWOPT,1
510     EQU     MANUAL,&H8
520     EQU     ANASW,4
530     EQU     DAYDIF,&HA000
540     EQU     MQ,9
```

```
550      EQU     AUTBST,&HFE
560      EQU     NABFL,&HFB
570      EQU     ABFL,&H4
580      EQU     FB,5
590      EQU     PGMSK,&H4
600      EQU     SMSK,&H20
610      EQU     CCRMSK,&H89
620      EQU     CLMSK,&H80
630      EQU     CMSK,1
640      EQU     RDHMSK,&H7A
650      EQU     RMSK,8
660      EQU     DHMSK,&H72
670      EQU     HMSK,&H40
680      EQU     MMSK,2
690      EQU     MCLMSK,&H82
700      EQU     VE,13
710      EQU     VN,14
720      EQU     VO,0
730      EQU     VF,&H11
740      EQU     FM,&HEF
750      EQU     AM,&HDF
760      EQU     COL,&HFD
770      EQU     IND,&H4
780      EQU     NWLMSK,&HF7
790      EQU     NITDIF,&HA001
800      EQU     WMSK,&H4
810      EQU     WLMSK,8
820      EQU     NHADJ,&HFC
830      EQU     DHADJ,&HFD
840      EQU     ITMSK,&HF5
850      EQU     OTMSK,&HFF
860      EQU     ICMSK,&HF6
870      EQU     DIFCMSK,&HF4
880      EQU     NITSW,4
890      EQU     DAYSW,2
900      EQU     LADDER,5
910      EQU     DIGPT,3
920      EQU     DMSK,&H10
930      EQU     SGN,&HFE
940      EQU     BBMSK,&H10
950      EQU     BBSTK,&H30
960      EQU     TEMPIN,&HA002
970      EQU     TEMPOUT,&HA003
980      EQU     DAY3,&H30E4
990      EQU     STOKE,&H20
1000     EQU     LASTN,&H20
1010     EQU     NLASTN,&HDF
1020     EQU     NSTOKE,&HDF
1030     EQU     FMPR,&H80
1040     EQU     NFMPR,&H7F
1050     EQU     HTOK,&H40
1060     EQU     NHTOK,&HBF
1070     EQU     COINBIT,4
1080     EQU     NCOINBIT,&HFB
1090     EQU     COLONBIT,2
1100     EQU     NCOLONBIT,&HFD
1110     EQU     ACCUM,&H30E5
```

|      |       | 1120 |       | EQU  | AUXBIT,1 |
|------|-------|------|-------|------|----------|
|      |       | 1130 |       | EQU  | NAUXBIT,&HFE |
|      |       | 1140 |       | EQU  | OPT,1 |
|      |       | 1150 |       | EQU  | RAM2,&H6000 |
|      |       | 1160 |       | EQU  | WINTER,8 |
|      |       | 1170 |       | EQU  | TENMIN,&H40  TENMIN,+H40 |
| 0000 | 71    | 1180 |       | DIS  |  |
| 0001 | 00    | 1190 |       | DB   | #0 |
| 0002 | F830  | 1200 |       | LDI  | A.1/RAM |
| 0004 | BE    | 1210 |       | PHI  | UTILP1 |
| 0005 | F800  | 1220 |       | LDI  | #0 |
| 0007 | AE    | 1230 |       | PLO  | UTILP1 |
| 0008 | 4E    | 1240 | MEMCK | LDA  | UTILP1 |
| 0009 | FF0A  | 1250 |       | SMI  | #.10 |
| 000B | 3323  | 1260 |       | BDF  | CLEAR |
| 000D | 4E    | 1270 |       | LDA  | UTILP1 |
| 000E | FF06  | 1280 |       | SMI  | #6 |
| 0010 | 3323  | 1290 |       | BDF  | CLEAR |
| 0012 | 4E    | 1300 |       | LDA  | UTILP1 |
| 0013 | FF0D  | 1310 |       | SMI  | #.13 |
| 0015 | 3323  | 1320 |       | BDF  | CLEAR |
| 0017 | 4E    | 1330 |       | LDA  | UTILP1 |
| 0018 | FF02  | 1340 |       | SMI  | #2 |
| 001A | 3323  | 1350 |       | BDF  | CLEAR |
| 001C | 8E    | 1360 |       | GLO  | UTILP1 |
| 001D | FBE0  | 1370 |       | XRI  | #E0 |
| 001F | 3A08  | 1380 |       | BNZ  | MEMCK |
| 0021 | 304B  | 1390 |       | BR   | RESTRT |
| 0023 | F8FF  | 1400 | CLEAR | LDI  | A.0/RAM2,+&HFF |
| 0025 | AE    | 1410 |       | PLO  | UTILP1 |
| 0026 | F860  | 1420 |       | LDI  | A.1/RAM2,+&HFF |
| 0028 | BE    | 1430 |       | PHI  | UTILP1 |
| 0029 | EE    | 1440 |       | SEX  | UTILP1 |
| 002A | F800  | 1450 |       | LDI  | #0 |
| 002C | 73    | 1460 |       | STXD |  |
| 002D | 9E    | 1470 |       | GHI  | UTILP1 |
| 002E | FA01  | 1480 |       | ANI  | #1 |
| 0030 | 322A  | 1490 |       | BZ   | *,-6 |
| 0032 | F830  | 1500 |       | LDI  | A.1/RAM |
| 0034 | BE    | 1510 |       | PHI  | UTILP1 |
| 0035 | F800  | 1520 |       | LDI  | #0 |
| 0037 | 73    | 1530 |       | STXD |  |
| 0038 | 9E    | 1540 |       | GHI  | UTILP1 |
| 0039 | FA01  | 1550 |       | ANI  | #1 |
| 003B | 3235  | 1560 |       | BZ   | *,-6 |
| 003D | F8C4  | 1570 |       | LDI  | #.196 |
| 003F | AD    | 1580 |       | PLO  | HZCNTR |
| 0040 | BD    | 1590 |       | PHI  | HZCNTR |
| 0041 | F803  | 1600 |       | LDI  | DNFIC |
| 0043 | A7    | 1610 |       | PLO  | FLAG |
| 0044 | F800  | 1620 |       | LDI  | #0 |
| 0046 | AC    | 1630 |       | PLO  | RSTMR |
| 0047 | BC    | 1640 |       | PHI  | H1.5H |
| 0048 | B7    | 1650 |       | PHI  | FLAG |
| 0049 | A8    | 1660 |       | PLO  | CYCTMR |
| 004A | B8    | 1670 |       | PHI  | CYCTMR |
| 004B | F852  | 1680 | RESTRT| LDI  | A.0/START |
| 004D | A3    | 1690 |       | PLO  | PC |
| 004E | F800  | 1700 |       | LDI  | A.1/START |
| 0050 | B3    | 1710 |       | PHI  | PC |
| 0051 | D3    | 1720 |       | SEP  | PC |
| 0052 | F8CA  | 1730 | START | LDI  | A.0/PWDN |
| 0054 | A1    | 1740 |       | PLO  | INT |
| 0055 | F80B  | 1750 |       | LDI  | A.1/PWDN |
| 0057 | B1    | 1760 |       | PHI  | INT |
| 0058 | E3    | 1770 |       | SEX  | PC |
| 0059 | 70    | 1780 |       | RET  |  |

| | | | | | |
|---|---|---|---|---|---|
| 005A | 33 | 1790 | | DT | &H33 |
| 005B | F801 | 1800 | | LDI | #1 |
| 005D | A6 | 1810 | | PLO | DISPL |
| 005E | BB | 1820 | | PHI | SYNC |
| 005F | F8E0 | 1830 | | LDI | A.0/TIME |
| 0061 | AF | 1840 | | PLO | RF |
| 0062 | F830 | 1850 | | LDI | A.1/TIME |
| 0064 | BF | 1860 | | PHI | RF |
| 0065 | F818 | 1870 | | LDI | A.0/STACK |
| 0067 | A2 | 1880 | | PLO | SP |
| 0068 | F8A0 | 1890 | | LDI | A.1/STACK |
| 006A | B2 | 1900 | | PHI | SP |
| 006B | 66 | 1910 | | OUT | CONTR |
| 006C | FF | 1920 | | DT | &HFF |
| 006D | 97 | 1930 | | GHI | FLAG |
| 006E | F904 | 1940 | | ORI | COINBIT |
| 0070 | B7 | 1950 | | PHI | FLAG |
| 0071 | 7A | 1960 | | REQ | |
| 0072 | F8E2 | 1970 | | LDI | A.0/TIME,+2 |
| 0074 | AE | 1980 | | PLO | UTILP1 |
| 0075 | F830 | 1990 | | LDI | A.1/TIME,+2 |
| 0077 | BE | 2000 | | PHI | UTILP1 |
| 0078 | 0E | 2010 | | LDN | UTILP1 |
| 0079 | C20149 | 2020 | | LBZ | DISPLAY,+1 |
| 007C | 1E | 2030 | | INC | UTILP1 |
| 007D | 1E | 2040 | | INC | UTILP1 |
| 007E | F830 | 2050 | | LDI | A.1/RAM |
| 0080 | BA | 2060 | | PHI | UTILP2 |
| 0081 | 0E | 2070 | | LDN | UTILP1 |
| 0082 | F6 | 2080 | | SHR | |
| 0083 | 76 | 2090 | | SHRC | |
| 0084 | 76 | 2100 | | SHRC | |
| 0085 | 76 | 2110 | | SHRC | |
| 0086 | F91F | 2120 | | ORI | #1F |
| 0088 | AA | 2130 | | PLO | UTILP2 |
| 0089 | F800 | 2140 | RUN2 | LDI | #0 |
| 008B | A9 | 2150 | | PLO | MQ |
| 008C | B9 | 2160 | | PHI | MQ |
| 008D | F8E3 | 2170 | NEW | LDI | A.0/TIME,+3 |
| 008F | AE | 2180 | | PLO | UTILP1 |
| 0090 | 8A | 2190 | | GLO | UTILP2 |
| 0091 | F903 | 2200 | | ORI | #3 |
| 0093 | AA | 2210 | | PLO | UTILP2 |
| 0094 | 2A | 2220 | | DEC | UTILP2 |
| 0095 | 0A | 2230 | | LDN | UTILP2 |
| 0096 | C20121 | 2240 | | LBZ | NST |
| 0099 | 1A | 2250 | | INC | UTILP2 |
| 009A | EE | 2260 | NI | SEX | UTILP1 |
| 009B | 8A | 2270 | | GLO | UTILP2 |
| 009C | FA03 | 2280 | | ANI | #3 |
| 009E | FB02 | 2290 | | XRI | #2 |
| 00A0 | 3AB1 | 2300 | | BNZ | NHKS |
| 00A2 | 0E | 2310 | | LDN | UTILP1 |
| 00A3 | FF0C | 2320 | | SMI | #.12 |

| | | | | |
|---|---|---|---|---|
| 00A5 | CF | 2330 | | LSDF |
| 00A6 | FC0C | 2340 | | ADI | #.12 |
| 00A8 | 52 | 2350 | | STR | SP |
| 00A9 | E2 | 2360 | | SEX | SP |
| 00AA | 0A | 2370 | | LDN | UTILP2 |
| 00AB | FF0C | 2380 | | SMI | #.12 |
| 00AD | CF | 2390 | | LSDF |
| 00AE | FC0C | 2400 | | ADI | #.12 |
| 00B0 | 38 | 2410 | | SKP |
| 00B1 | 0A | 2420 | NHRS | LDN | UTILP2 |
| 00B2 | F5 | 2430 | | SD |
| 00B3 | CB0121 | 2440 | | LBNF | NST |
| 00B6 | 3AC2 | 2450 | | BNZ | GOOD1 |
| 00B8 | 2E | 2460 | | DEC | UTILP1 |
| 00B9 | 2A | 2470 | | DEC | UTILP2 |
| 00BA | 8A | 2480 | | GLO | UTILP2 |
| 00BB | FA03 | 2490 | | ANI | #3 |
| 00BD | FB03 | 2500 | | XRI | #3 |
| 00BF | 3A9A | 2510 | | BNZ | ND |
| 00C1 | 1A | 2520 | | INC | UTILP2 |
| 00C2 | 99 | 2530 | GOOD1 | GHI | MQ |
| 00C3 | 32F1 | 2540 | | BZ | GOOD2 |
| 00C5 | 8A | 2550 | | GLO | UTILP2 |
| 00C6 | F903 | 2560 | | ORI | #3 |
| 00C8 | AA | 2570 | | PLO | UTILP2 |
| 00C9 | EA | 2580 | ND2 | SEX | UTILP2 |
| 00CA | 89 | 2590 | | GLO | MQ |
| 00CB | FA03 | 2600 | | ANI | #3 |
| 00CD | FB02 | 2610 | | XRI | #2 |
| 00CF | 3AE0 | 2620 | | BNZ | NHRS2 |
| 00D1 | 0A | 2630 | | LDN | UTILP2 |
| 00D2 | FF0C | 2640 | | SMI | #.12 |
| 00D4 | CF | 2650 | | LSDF |
| 00D5 | FC0C | 2660 | | ADI | #.12 |
| 00D7 | 52 | 2670 | | STR | SP |
| 00D8 | E2 | 2680 | | SEX | SP |
| 00D9 | 09 | 2690 | | LDN | MQ |
| 00DA | FF0C | 2700 | | SMI | #.12 |
| 00DC | CF | 2710 | | LSDF |
| 00DD | FC0C | 2720 | | ADI | #.12 |
| 00DF | 38 | 2730 | | SKP |
| 00E0 | 09 | 2740 | NHRS2 | LDN | MQ |
| 00E1 | F5 | 2750 | | SD |
| 00E2 | CB0121 | 2760 | | LBNF | NST |
| 00E5 | 3AF1 | 2770 | | BNZ | GOOD2 |
| 00E7 | 2A | 2780 | | DEC | UTILP2 |
| 00E8 | 29 | 2790 | | DEC | MQ |
| 00E9 | 89 | 2800 | | GLO | MQ |
| 00EA | FA03 | 2810 | | ANI | #3 |
| 00EC | FB03 | 2820 | | XRI | #3 |
| 00EE | 3AC9 | 2830 | | BNZ | ND2 |
| 00F0 | 1A | 2840 | | INC | UTILP2 |
| 00F1 | 9A | 2850 | GOOD2 | GHI | UTILP2 |
| 00F2 | B9 | 2860 | | PHI | MQ |
| 00F3 | 8A | 2870 | | GLO | UTILP2 |
| 00F4 | A9 | 2880 | | PLO | MQ |

| | | | | | |
|---|---|---|---|---|---|
| 00F5 | C00121 | 2890 | | LBR | NST |
| 00F8 | C10102 | 2900 | CDAY | LBQ | CCLS |
| 00FB | 87 | 2910 | | GLO | FLAG |
| 00FC | F903 | 2920 | | ORI | DNFIC |
| 00FE | A7 | 2930 | | PLO | FLAG |
| 00FF | C00141 | 2940 | | LBR | CAUX |
| 0102 | 97 | 2950 | CCLS | GHI | FLAG |
| 0103 | F901 | 2960 | | ORI | AUXBIT |
| 0105 | B7 | 2970 | | PHI | FLAG |
| 0106 | 3049 | 2980 | | BR | DISPLAY,+1 |
| 0108 | 311B | 2990 | CNIT | BQ | COPN |
| 010A | 8C | 3000 | | GLO | RSTMR |
| 010B | CA00F8 | 3010 | | LBNZ | CDAY |
| 010E | 87 | 3020 | | GLO | FLAG |
| 010F | FAFE | 3030 | | ANI | NDNF |
| 0111 | A7 | 3040 | | PLO | FLAG |
| 0112 | 9C | 3050 | | GHI | H1.5H |
| 0113 | 3A41 | 3060 | | BNZ | CAUX |
| 0115 | 87 | 3070 | | GLO | FLAG |
| 0116 | FAFC | 3080 | | ANI | NDNFIC |
| 0118 | A7 | 3090 | | PLO | FLAG |
| 0119 | 3041 | 3100 | | BR | CAUX |
| 011B | 97 | 3110 | COPN | GHI | FLAG |
| 011C | FAFE | 3120 | | ANI | NAUXBIT |
| 011E | B7 | 3130 | | PHI | FLAG |
| 011F | 3049 | 3140 | | BR | DISPLAY,+1 |
| 0121 | 8A | 3150 | NST | GLO | UTILP2 |
| 0122 | F903 | 3160 | | ORI | #3 |
| 0124 | FF04 | 3170 | | SMI | #4 |
| 0126 | AA | 3180 | | PLO | UTILP2 |
| 0127 | FA1C | 3190 | | ANI | #1C |
| 0129 | FB1C | 3200 | | XRI | #1C |
| 012B | 1A | 3210 | | INC | UTILP2 |
| 012C | 3236 | 3220 | | BZ | SWTC |
| 012E | 89 | 3230 | | GLO | MQ |
| 012F | F903 | 3240 | | ORI | #3 |
| 0131 | A9 | 3250 | | PLO | MQ |
| 0132 | 2A | 3260 | | DEC | UTILP2 |
| 0133 | C0008D | 3270 | | LBR | NEW |
| 0136 | 99 | 3280 | SWTC | GHI | MQ |
| 0137 | 3208 | 3290 | | BZ | CNIT |
| 0139 | 89 | 3300 | | GLO | MQ |
| 013A | FA04 | 3310 | | ANI | #4 |
| 013C | 3A08 | 3320 | | BNZ | CNIT |
| 013E | C000F8 | 3330 | | LBR | CDAY |
| 0141 | 7B | 3340 | CAUX | SEQ | |
| 0142 | F860 | 3350 | | LDI | A.1/RAM2 |
| 0144 | BA | 3360 | | PHI | UTILP2 |
| 0145 | C00089 | 3370 | | LBR | RUN2 |
| 0148 | D4 | 3380 | DISPLAY | SEP | SUB |
| 0149 | E2 | 3390 | | SEX | SP |
| 014A | 26 | 3400 | | DEC | DISPL |
| 014B | 86 | 3410 | | GLO | DISPL |
| 014C | 3A5B | 3420 | | BNZ | NEXD |
| 014E | F808 | 3430 | | LDI | #8 |
| 0150 | A6 | 3440 | | PLO | DISPL |
| 0151 | F8B7 | 3450 | | LDI | A.0/MEASURE |

| | | | | | |
|---|---|---|---|---|---|
| 0153 | A4 | | 3460 | PLO | SUB |
| 0154 | F808 | | 3470 | LDI | A.1/MEASURE |
| 0156 | B4 | | 3480 | PHI | SUB |
| 0157 | 98 | | 3490 | GHI | SYNC |
| 0158 | FC01 | | 3500 | ADI | #1 |
| 015A | B8 | | 3510 | PHI | SYNC |
| 015B | F8FF | | 3520 | NEXD LDI | #FF |
| 015D | 52 | | 3530 | STR | SP |
| 015E | 62 | | 3540 | OUT | SEGPT |
| 015F | 22 | | 3550 | DEC | SP |
| 0160 | 86 | | 3560 | GLO | DISPL |
| 0161 | FC01 | | 3570 | ADI | A.0/SCANCHT,-1 |
| 0163 | AE | | 3580 | PLO | UTILP1 |
| 0164 | F800 | | 3590 | LDI | #0 |
| 0166 | 7C0E | | 3600 | ADCI | A.1/SCANCHT,-1 |
| 0168 | BE | | 3610 | PHI | UTILP1 |
| 0169 | EE | | 3620 | SEX | UTILP1 |
| 016A | 63 | | 3630 | OUT | DIGPT |
| 016B | 86 | | 3640 | GLO | DISPL |
| 016C | FC04 | | 3650 | ADI | A.0/DISP,-1 |
| 016E | AE | | 3660 | PLO | UTILP1 |
| 016F | F8A0 | | 3670 | LDI | A.1/DISP,-1 |
| 0171 | BE | | 3680 | PHI | UTILP1 |
| 0172 | 62 | | 3690 | OUT | SEGPT |
| 0173 | E2 | | 3700 | HZCNT SEX | SP |
| 0174 | 3F7D | | 3710 | BN4 | *,+9 |
| 0176 | 87 | | 3720 | GLO | FLAG |
| 0177 | FA7F | | 3730 | ANI | NHZMSK |
| 0179 | A7 | | 3740 | PLO | FLAG |
| 017A | C00148 | | 3750 | LBR | DISPLAY |
| 017D | 87 | | 3760 | GLO | FLAG |
| 017E | FA80 | | 3770 | ANI | HZMSK |
| 0180 | CA0148 | | 3780 | LBNZ | DISPLAY |
| 0183 | 87 | | 3790 | GLO | FLAG |
| 0184 | F980 | | 3800 | ORI | HZMSK |
| 0186 | A7 | | 3810 | PLO | FLAG |
| 0187 | FA40 | | 3820 | ANI | BMSK |
| 0189 | C6 | | 3830 | LSNZ | |
| 018A | 3092 | | 3840 | BR | *,+8 |
| 018C | 96 | | 3850 | GHI | BUTMR |
| 018D | C6 | | 3860 | LSNZ | |
| 018E | F837 | | 3870 | LDI | #.55 |
| 0190 | FF01 | | 3880 | SMI | #1 |
| 0192 | B6 | | 3890 | PHI | BUTMR |
| 0193 | 3A99 | | 3900 | BNZ | *,+6 |
| 0195 | 87 | | 3910 | GLO | FLAG |
| 0196 | FABF | | 3920 | ANI | NBMSK |
| 0198 | A7 | | 3930 | PLO | FLAG |
| 0199 | 1D | | 3940 | INC | HZCNTR |
| 019A | 8D | | 3950 | AFTCON GLO | HZCNTR |
| 019B | CA0148 | | 3960 | LBNZ | DISPLAY |
| 019E | 6E | | 3970 | INP | SW |
| 019F | FA20 | | 3980 | ANI | HZ |
| 01A1 | C201A7 | | 3990 | LBZ | *,+6 |
| 01A4 | F8CE | | 4000 | LDI | #.206 |
| 01A6 | C8 | | 4010 | LSKP | |
| 01A7 | F8C4 | | 4020 | LDI | #.196 |
| 01A9 | AD | | 4030 | PLO | HZCNTR |
| 01AA | E2 | | 4040 | SEX | SP |
| 01AB | 98 | | 4050 | GHI | CYCTMR |
| 01AC | C201E7 | | 4060 | LBZ | ONEMIN |
| 01AF | 6E | | 4070 | INP | SW |
| 01B0 | FA10 | | 4080 | ANI | REDMSK |
| 01B2 | C201BF | | 4090 | LBZ | *,+13 |
| 01B5 | 98 | | 4100 | GHI | CYCTMR |
| 01B6 | FC01 | | 4110 | ADI | #1 |
| 01B8 | B8 | | 4120 | PHI | CYCTMR |
| 01B9 | F800 | | 4130 | LDI | #0 |
| 01BB | A8 | | 4140 | PLO | CYCTMR |

| | | | | | |
|---|---|---|---|---|---|
| 01BC | C001C7 | 4150 | | LBR | *,+11 |
| 01BF | 88 | 4160 | | GLO | CYCTMR |
| 01C0 | CA01C6 | 4170 | | LBNZ | *,+6 |
| 01C3 | F8C4 | 4180 | | LDI | #.196 |
| 01C5 | A8 | 4190 | | PLO | CYCTMR |
| 01C6 | 18 | 4200 | | INC | CYCTMR |
| 01C7 | 88 | 4210 | | GLO | CYCTMR |
| 01C8 | CA01E7 | 4220 | | LBNZ | ONEMIN |
| 01CB | F80D | 4230 | | LDI | A.1/TIMLMT |
| 01CD | BE | 4240 | | PHI | UTILP1 |
| 01CE | 6E | 4250 | | INP | SW |
| 01CF | FA03 | 4260 | | ANI | #3 |
| 01D1 | FC00 | 4270 | | ADI | A.0/TIMLMT |
| 01D3 | AE | 4280 | | PLO | UTILP1 |
| 01D4 | 69 | 4290 | | INP | SWOPT |
| 01D5 | FA40 | 4300 | | ANI | TENMIN |
| 01D7 | CE | 4310 | | LSZ | |
| 01D8 | 1E | 4320 | | INC | UTILP1 |
| 01D9 | C4 | 4330 | | NOP | |
| 01DA | 98 | 4340 | | GHI | CYCTMR |
| 01DB | 52 | 4350 | | STR | SP |
| 01DC | 0E | 4360 | | LDN | UTILP1 |
| 01DD | F7 | 4370 | | SM | |
| 01DE | 33E7 | 4380 | | BDF | ONEMIN |
| 01E0 | F800 | 4390 | | LDI | #0 |
| 01E2 | B8 | 4400 | | PHI | CYCTMR |
| 01E3 | 87 | 4410 | | GLO | FLAG |
| 01E4 | FAEF | 4420 | | ANI | NBRMSK |
| 01E6 | A7 | 4430 | | PLO | FLAG |
| 01E7 | 9D | 4440 | ONEMIN | GHI | HZCNTR |
| 01E8 | CA0148 | 4450 | | LBNZ | DISPLAY |
| 01EB | 97 | 4460 | | GHI | FLAG |
| 01EC | F904 | 4470 | | ORI | COINBIT |
| 01EE | B7 | 4480 | | PHI | FLAG |
| 01EF | 8C | 4490 | RSTIM | GLO | RSTMR |
| 01F0 | C20205 | 4500 | | LBZ | RSTEND |
| 01F3 | F800 | 4510 | | LDI | #0 |
| 01F5 | B8 | 4520 | | PHI | CYCTMR |
| 01F6 | A8 | 4530 | | PLO | CYCTMR |
| 01F7 | 2C | 4540 | | DEC | RSTMR |
| 01F8 | 8C | 4550 | | GLO | RSTMR |
| 01F9 | CA0205 | 4560 | | LBNZ | RSTEND |
| 01FC | 87 | 4570 | | GLO | FLAG |
| 01FD | FA08 | 4580 | | ANI | WLMSK |
| 01FF | C20205 | 4590 | | LBZ | RSTEND |
| 0202 | F801 | 4600 | | LDI | #1 |
| 0204 | B8 | 4610 | | PHI | CYCTMR |
| 0205 | F8C4 | 4620 | RSTEND | LDI | #.196 |
| 0207 | BD | 4630 | | PHI | HZCNTR |
| 0208 | 6E | 4640 | | INP | SW |
| 0209 | FA08 | 4650 | | ANI | MANUAL |
| 020B | C2023B | 4660 | | LBZ | MININC |
| 020E | F8E5 | 4670 | | LDI | A.0/ACCUM |
| 0210 | AE | 4680 | | PLO | UTILP1 |
| 0211 | F830 | 4690 | | LDI | A.1/RAM |
| 0213 | BE | 4700 | | PHI | UTILP1 |
| 0214 | 0E | 4710 | | LDN | UTILP1 |
| 0215 | FF09 | 4720 | | SMI | #9 |
| 0217 | 331D | 4730 | | BDF | *,+6 |
| 0219 | FC0A | 4740 | | ADI | #A |
| 021B | FE | 4750 | | SHL | |
| 021C | F6 | 4760 | | SHR | |
| 021D | 5E | 4770 | | STR | UTILP1 |
| 021E | 1E | 4780 | | INC | UTILP1 |
| 021F | 0E | 4790 | | LDN | UTILP1 |
| 0220 | 7F05 | 4800 | | SMBI | #5 |

| | | | | | |
|---|---|---|---|---|---|
| 0222 | 3328 | 4810 | | BDF | *,+6 |
| 0224 | FC06 | 4820 | | ADI | #6 |
| 0226 | FE | 4830 | | SHL | |
| 0227 | F6 | 4840 | | SHR | |
| 0228 | 5E | 4850 | | STR | UTILP1 |
| 0229 | 3B3B | 4860 | | BNF | MININC |
| 022B | 1E | 4870 | LP4 | INC | UTILP1 |
| 022C | 8E | 4880 | | GLO | UTILP1 |
| 022D | FBEB | 4890 | | XRI | A.0/ACCUM,+6 |
| 022F | 323B | 4900 | | BZ | MININC |
| 0231 | 0E | 4910 | | LDN | UTILP1 |
| 0232 | FF09 | 4920 | | SMI | #9 |
| 0234 | 5E | 4930 | | STR | UTILP1 |
| 0235 | C3022B | 4940 | | LBDF | LP4 |
| 0238 | FC0A | 4950 | | ADI | #A |
| 023A | 5E | 4960 | | STR | UTILP1 |
| 023B | F8E2 | 4970 | MININC | LDI | A.0/TIME,+2 |
| 023D | AE | 4980 | | PLO | UTILP1 |
| 023E | F830 | 4990 | | LDI | A.1/TIME |
| 0240 | BE | 5000 | | PHI | UTILP1 |
| 0241 | 0E | 5010 | | LDN | UTILP1 |
| 0242 | C20259 | 5020 | | LBZ | IEX |
| 0245 | 2E | 5030 | | DEC | UTILP1 |
| 0246 | 2E | 5040 | | DEC | UTILP1 |
| 0247 | F8B3 | 5050 | | LDI | A.0/INCMIN |
| 0249 | A5 | 5060 | | PLO | SUBSUB |
| 024A | F80D | 5070 | | LDI | A.1/INCMIN |
| 024C | B5 | 5080 | | PHI | SUBSUB |
| 024D | 24 | 5090 | | DEC | SUB |
| 024E | D5 | 5100 | | SEP | SUBSUB |
| 024F | CB0259 | 5110 | | LBNF | IEX |
| 0252 | 24 | 5120 | | DEC | SUB |
| 0253 | D5 | 5130 | | SEP | SUBSUB |
| 0254 | CB0259 | 5140 | | LBNF | IEX |
| 0257 | 24 | 5150 | | DEC | SUB |
| 0258 | D5 | 5160 | | SEP | SUBSUB |
| 0259 | 9C | 5170 | IEX | GHI | H1.5H |
| 025A | 325F | 5180 | | BZ | TEX |
| 025C | FF01 | 5190 | | SMI | #1 |
| 025E | BC | 5200 | | PHI | H1.5H |
| 025F | C00148 | 5210 | TEX | LBR | DISPLAY |
| 0262 | E2 | 10010 | SUBSTART | SEX | SP |
| 0263 | 9C | 10020 | | GHI | H1.5H |
| 0264 | 3A72 | 10030 | | BNZ | DEX |
| 0266 | 8C | 10040 | | GLO | RSTMR |
| 0267 | 3A72 | 10050 | | BNZ | DEX |
| 0269 | 87 | 10060 | | GLO | FLAG |
| 026A | FA01 | 10070 | | ANI | DNF |
| 026C | 3A72 | 10080 | | BNZ | DEX |
| 026E | 87 | 10090 | | GLO | FLAG |
| 026F | FAFD | 10100 | | ANI | NDNFC |
| 0271 | A7 | 10110 | | PLO | FLAG |
| 0272 | F804 | 10120 | DEX | LDI | #4 |
| 0274 | A0 | 10130 | | PLO | TEMP |
| 0275 | 87 | 10140 | | GLO | FLAG |
| 0276 | FA02 | 10150 | | ANI | DNFC |

| | | | | |
|---|---|---|---|---|
| 0278 | C6 | 10160 | LSNZ | |
| 0279 | 80 | 10170 | GLO | TEMP |
| 027A | CB | 10180 | LSKP | |
| 027B | F880 | 10190 | LDI | #80 |
| 027D | 52 | 10200 | STR | SP |
| 027E | 87 | 10210 | GLO | FLAG |
| 027F | FA30 | 10220 | ANI | BRSTK |
| 0281 | CE | 10230 | LSZ | |
| 0282 | F801 | 10240 | LDI | #1 |
| 0284 | F1 | 10250 | OR | |
| 0285 | 52 | 10260 | STR | SP |
| 0286 | 87 | 10270 | GLO | FLAG |
| 0287 | FA08 | 10280 | ANI | WLMSK |
| 0289 | CE | 10290 | LSZ | |
| 028A | F840 | 10300 | LDI | #40 |
| 028C | F1 | 10310 | OR | |
| 028D | 52 | 10320 | STR | SP |
| 028E | 97 | 10330 | GHI | FLAG |
| 028F | FA80 | 10340 | ANI | PMPR |
| 0291 | CE | 10350 | LSZ | |
| 0292 | F802 | 10360 | LDI | #2 |
| 0294 | F1 | 10370 | OR | |
| 0295 | 52 | 10380 | STR | SP |
| 0296 | 97 | 10390 | GHI | FLAG |
| 0297 | FA01 | 10400 | ANI | AUXBIT |
| 0299 | CE | 10410 | LSZ | |
| 029A | F810 | 10420 | LDI | #10 |
| 029C | F1 | 10430 | OR | |
| 029D | 52 | 10440 | STR | SP |
| 029E | 98 | 10450 | GHI | CYCTMR |
| 029F | CE | 10460 | LSZ | |
| 02A0 | F820 | 10470 | LDI | #20 |
| 02A2 | F1 | 10480 | OR | |
| 02A3 | 52 | 10490 | STR | SP |
| 02A4 | 8C | 10500 | GLO | BSTMR |
| 02A5 | CE | 10510 | LSZ | |
| 02A6 | F808 | 10520 | LDI | #8 |
| 02A8 | F1 | 10530 | OR | |
| 02A9 | FBFF | 10540 | XRI | #FF |
| 02AB | A0 | 10550 | PLO | TEMP |
| 02AC | 69 | 10560 | INP | SWOPT |
| 02AD | FA08 | 10570 | ANI | WINTER |
| 02AF | FB08 | 10580 | XRI | WINTER |
| 02B1 | 32BD | 10590 | BZ | NOTWIN |
| 02B3 | 87 | 10591 | GLO | FLAG |
| 02B4 | FA20 | 10592 | ANI | STOKE |
| 02B6 | FF01 | 10593 | SMI | #1 |
| 02B8 | F8AE | 10594 | LDI | #AE |
| 02BA | CF | 10595 | LSDF | |
| 02BB | F8AF | 10600 | LDI | #AF |
| 02BD | 52 | 10610 NOTWIN | STR | SP |
| 02BE | 80 | 10620 | GLO | TEMP |
| 02BF | F1 | 10630 | OR | |
| 02C0 | 52 | 10640 | STR | SP |
| 02C1 | 9B | 10650 | GHI | SYNC |
| 02C2 | FA03 | 10660 | ANI | #3 |

| | | | | | |
|---|---|---|---|---|---|
| 02C4 | C6 | 10670 | | LSNZ | |
| 02C5 | 66 | 10680 | | OUT | CONTR |
| 02C6 | 22 | 10690 | | DEC | SP |
| 02C7 | F830 | 10700 | | LDI | A.1/RAM |
| 02C9 | BE | 10710 | | PHI | UTILP1 |
| 02CA | F8E4 | 10720 | | LDI | A.0/DAY3 |
| 02CC | AE | 10730 | | PLO | UTILP1 |
| 02CD | 0E | 10740 | | LDN | UTILP1 |
| 02CE | 76 | 10750 | | SHRC | |
| 02CF | 76 | 10760 | | SHRC | |
| 02D0 | 76 | 10770 | | SHRC | |
| 02D1 | 76 | 10780 | | SHRC | |
| 02D2 | FAE0 | 10790 | | ANI | #E0 |
| 02D4 | F91E | 10800 | | ORI | #1E |
| 02D6 | AE | 10810 | | PLO | UTILP1 |
| 02D7 | 97 | 10820 | | GHI | FLAG |
| 02D8 | FABF | 10830 | | ANI | NHTOK |
| 02DA | B7 | 10840 | | PHI | FLAG |
| 02DB | 69 | 10850 | | INP | SWOPT |
| 02DC | FA08 | 10860 | | ANI | WINTER |
| 02DE | C20302 | 10870 | | LBZ | AUXTST |
| 02E1 | 87 | 10872 | | GLO | FLAG |
| 02E2 | FA02 | 10874 | | ANI | DNFC |
| 02E4 | 3AF7 | 10876 | | BNZ | MHTOK |
| 02E6 | 0E | 10880 | | LDN | UTILP1 |
| 02E7 | C202F7 | 10890 | | LBZ | MHTOK |
| 02EA | 8E | 10900 | NHL | GLO | UTILP1 |
| 02EB | FF04 | 10910 | | SMI | #4 |
| 02ED | AE | 10920 | | PLO | UTILP1 |
| 02EE | FA1C | 10930 | | ANI | #1C |
| 02F0 | FB1C | 10940 | | XRI | #1C |
| 02F2 | 32FE | 10950 | | BZ | CORDAY |
| 02F4 | 0E | 10960 | | LDN | UTILP1 |
| 02F5 | 32EA | 10970 | | BZ | NHL |
| 02F7 | 97 | 10980 | MHTOK | GHI | FLAG |
| 02F8 | F940 | 10990 | | ORI | HTOK |
| 02FA | B7 | 11000 | | PHI | FLAG |
| 02FB | C00302 | 11010 | | LBR | AUXTST |
| 02FE | 8E | 11020 | CORDAY | GLO | UTILP1 |
| 02FF | FC04 | 11030 | | ADI | #4 |
| 0301 | AE | 11040 | | PLO | UTILP1 |
| 0302 | F860 | 11050 | AUXTST | LDI | A.1/RAM2 |
| 0304 | BE | 11060 | | PHI | UTILP1 |
| 0305 | 8E | 11070 | | GLO | UTILP1 |
| 0306 | F91E | 11080 | | ORI | #1E |
| 0308 | AE | 11090 | | PLO | UTILP1 |
| 0309 | 0E | 11100 | AUXL | LDN | UTILP1 |
| 030A | CA031C | 11110 | | LBNZ | AUXOK |
| 030D | 8E | 11120 | | GLO | UTILP1 |
| 030E | FF04 | 11130 | | SMI | #4 |
| 0310 | AE | 11140 | | PLO | UTILP1 |
| 0311 | FA1C | 11150 | | ANI | #1C |
| 0313 | FB1C | 11160 | | XRI | #1C |
| 0315 | CA0309 | 11170 | | LBNZ | AUXL |
| 0318 | 97 | 11180 | | GHI | FLAG |
| 0319 | FAFE | 11190 | | ANI | NAUXBIT |

| | | | | | |
|---|---|---|---|---|---|
| 031B | B7 | 11200 | | PHI | FLAG |
| 031C | 69 | 11210 | AUXOK | INP | SWOPT |
| 031D | FA02 | 11220 | | ANI | AUTMSK |
| 031F | 322B | 11230 | | BZ | NAUT |
| 0321 | 87 | 11240 | | GLO | FLAG |
| 0322 | FA04 | 11250 | | ANI | ABFL |
| 0324 | 3A37 | 11260 | | BNZ | CYCTIM |
| 0326 | 87 | 11270 | | GLO | FLAG |
| 0327 | F904 | 11280 | | ORI | ABFL |
| 0329 | 3033 | 11290 | | BR | BSTOFF |
| 032B | 87 | 11300 | NAUT | GLO | FLAG |
| 032C | FA04 | 11310 | | ANI | ABFL |
| 032E | 3237 | 11320 | | BZ | CYCTIM |
| 0330 | 87 | 11330 | | GLO | FLAG |
| 0331 | FAFB | 11340 | | ANI | NABFL |
| 0333 | A7 | 11350 | BSTOFF | PLO | FLAG |
| 0334 | F800 | 11360 | | LDI | #0 |
| 0336 | AC | 11370 | | PLO | BSTMR |
| 0337 | 97 | 11380 | CYCTIM | GHI | FLAG |
| 0338 | FA04 | 11390 | | ANI | COINBIT |
| 033A | C20551 | 11400 | | LBZ | BUTTON |
| 033D | 97 | 11410 | | GHI | FLAG |
| 033E | FAFB | 11420 | | ANI | NCOINBIT |
| 0340 | B7 | 11430 | | PHI | FLAG |
| 0341 | 69 | 11431 | | INP | SWOPT |
| 0342 | FA08 | 11432 | | ANI | WINTER |
| 0344 | FF01 | 11433 | | SMI | #1 |
| 0346 | 87 | 11434 | | GLO | FLAG |
| 0347 | CF | 11435 | | LSDF | |
| 0348 | FAEF | 11436 | | ANI | NBBMSK |
| 034A | A7 | 11437 | | PLO | FLAG |
| 034B | 6E | 11440 | | INP | SW |
| 034C | FA80 | 11450 | | ANI | COAL |
| 034E | 3A57 | 11460 | | BNZ | STKST |
| 0350 | 87 | 11470 | NSTK | GLO | FLAG |
| 0351 | FADF | 11480 | | ANI | NSTOKE |
| 0353 | A7 | 11490 | | PLO | FLAG |
| 0354 | C003A1 | 11500 | | LBR | CONCHK |
| 0357 | 7A | 11510 | STKST | REQ | |
| 0358 | F8ED | 11520 | | LDI | A.0/STON |
| 035A | AA | 11530 | | PLO | UTILP2 |
| 035B | F830 | 11540 | | LDI | A.1/STON |
| 035D | BA | 11550 | | PHI | UTILP2 |
| 035E | BE | 11560 | | PHI | UTILP1 |
| 035F | F8F1 | 11570 | | LDI | A.0/STIM |
| 0361 | AE | 11580 | | PLO | UTILP1 |
| 0362 | 87 | 11590 | | GLO | FLAG |
| 0363 | FA10 | 11600 | | ANI | BBMSK |
| 0365 | 3273 | 11610 | | BZ | STDEC |
| 0367 | 1A | 11620 | SOFF | INC | UTILP2 |
| 0368 | 1A | 11630 | | INC | UTILP2 |
| 0369 | 4A | 11640 | SON | LDA | UTILP2 |
| 036A | 5E | 11650 | | STR | UTILP1 |
| 036B | 0A | 11660 | | LDN | UTILP2 |
| 036C | 1E | 11670 | | INC | UTILP1 |
| 036D | 5E | 11680 | | STR | UTILP1 |

| | | | | | |
|---|---|---|---|---|---|
| 036E | 2E | 11690 | | DEC | UTILP1 |
| 036F | 2A | 11700 | | DEC | UTILP2 |
| 0370 | CD | 11710 | | LSQ | |
| 0371 | 3050 | 11720 | | BR | NSTK |
| 0373 | C10386 | 11730 | STDEC | LBQ | TIMST |
| 0376 | 0E | 11740 | | LDN | UTILP1 |
| 0377 | FF01 | 11750 | | SMI | #1 |
| 0379 | 5E | 11760 | | STR | UTILP1 |
| 037A | C30386 | 11770 | | LBDF | TIMST |
| 037D | FC0A | 11780 | | ADI | #A |
| 037F | 5E | 11790 | | STR | UTILP1 |
| 0380 | 1E | 11800 | | INC | UTILP1 |
| 0381 | 0E | 11810 | | LDN | UTILP1 |
| 0382 | FF01 | 11820 | | SMI | #1 |
| 0384 | 5E | 11830 | | STR | UTILP1 |
| 0385 | 2E | 11840 | | DEC | UTILP1 |
| 0386 | 1E | 11850 | TIMST | INC | UTILP1 |
| 0387 | 0E | 11860 | | LDN | UTILP1 |
| 0388 | 52 | 11870 | | STR | SP |
| 0389 | 2E | 11880 | | DEC | UTILP1 |
| 038A | FA08 | 11890 | | ANI | #8 |
| 038C | 3A92 | 11900 | | BNZ | ST? |
| 038E | 0E | 11910 | | LDN | UTILP1 |
| 038F | F1 | 11920 | | OR | |
| 0390 | 3AA1 | 11930 | | BNZ | CONCHK |
| 0392 | 87 | 11940 | ST? | GLO | FLAG |
| 0393 | FA20 | 11950 | | ANI | STOKE |
| 0395 | 7A | 11960 | | REQ | |
| 0396 | CA0367 | 11970 | | LBNZ | SOFF |
| 0399 | 87 | 11980 | | GLO | FLAG |
| 039A | F920 | 11990 | | ORI | STOKE |
| 039C | A7 | 12000 | | PLO | FLAG |
| 039D | 7B | 12010 | | SEQ | |
| 039E | C00369 | 12020 | | LBR | SON |
| 03A1 | F8E4 | 12030 | CONCHK | LDI | A.0/DAY3 |
| 03A3 | AE | 12040 | | PLO | UTILP1 |
| 03A4 | F830 | 12050 | | LDI | A.1/DAY3 |
| 03A6 | BE | 12060 | | PHI | UTILP1 |
| 03A7 | F860 | 12070 | | LDI | A.1/RAM2 |
| 03A9 | BA | 12080 | | PHI | UTILP2 |
| 03AA | 0E | 12090 | | LDN | UTILP1 |
| 03AB | 76 | 12100 | | SHRC | |
| 03AC | 76 | 12110 | | SHRC | |
| 03AD | 76 | 12120 | | SHRC | |
| 03AE | 76 | 12130 | | SHRC | |
| 03AF | FAE0 | 12140 | | ANI | #E0 |
| 03B1 | AA | 12150 | | PLO | UTILP2 |
| 03B2 | EE | 12160 | | SEX | UTILP1 |
| 03B3 | F8E2 | 12170 | | LDI | A.0/TIME,+2 |
| 03B5 | AE | 12180 | | PLO | UTILP1 |
| 03B6 | 0E | 12190 | | LDN | UTILP1 |
| 03B7 | C20551 | 12200 | | LBZ | BUTTON |
| 03BA | 2E | 12210 | | DEC | UTILP1 |
| 03BB | 2E | 12220 | | DEC | UTILP1 |
| 03BC | 4A | 12230 | CMPD | LDA | UTILP2 |
| 03BD | F7 | 12240 | | SM | |

| | | | | | |
|---|---|---|---|---|---|
| 03BE | CA03CB | 12250 | | LBNZ | NXT |
| 03C1 | 8A | 12260 | | GLO | UTILP2 |
| 03C2 | FA03 | 12270 | | ANI | #3 |
| 03C4 | C203DA | 12280 | | LBZ | COIN |
| 03C7 | 60 | 12290 | | IRX | |
| 03C8 | C003BC | 12300 | | LBR | CMPD |
| 03CB | 2A | 12310 | NXT | DEC | UTILP2 |
| 03CC | 8A | 12320 | | GLO | UTILP2 |
| 03CD | FAFC | 12330 | | ANI | #FC |
| 03CF | FC04 | 12340 | | ADI | #4 |
| 03D1 | AA | 12350 | | PLO | UTILP2 |
| 03D2 | FA1F | 12360 | | ANI | #1F |
| 03D4 | C20453 | 12370 | | LBZ | NOCOIN |
| 03D7 | C003B3 | 12380 | | LBR | CMPD,-9 |
| 03DA | 2A | 12390 | COIN | DEC | UTILP2 |
| 03DB | 9A | 12400 | | GHI | UTILP2 |
| 03DC | FA10 | 12410 | | ANI | #10 |
| 03DE | CA03F5 | 12420 | | LBNZ | PRIM |
| 03E1 | 8A | 12430 | | GLO | UTILP2 |
| 03E2 | FA04 | 12440 | | ANI | #4 |
| 03E4 | 32EB | 12450 | | BZ | *,+7 |
| 03E6 | 97 | 12460 | | GHI | FLAG |
| 03E7 | FAFE | 12470 | | ANI | NAUXBIT |
| 03E9 | 30EE | 12480 | | BR | *,+5 |
| 03EB | 97 | 12490 | | GHI | FLAG |
| 03EC | F901 | 12500 | | ORI | AUXBIT |
| 03EE | B7 | 12510 | | PHI | FLAG |
| 03EF | 9E | 12520 | | GHI | UTILP1 |
| 03F0 | BA | 12530 | | PHI | UTILP2 |
| 03F1 | 8A | 12540 | | GLO | UTILP2 |
| 03F2 | C003AF | 12550 | | LBR | CMPD,-13 |
| 03F5 | 8A | 12560 | PRIM | GLO | UTILP2 |
| 03F6 | FA04 | 12570 | | ANI | #4 |
| 03F8 | C2041D | 12580 | | LBZ | DY |
| 03FB | 8A | 12590 | LASTCK | GLO | UTILP2 |
| 03FC | FAFC | 12600 | | ANI | #FC |
| 03FE | F902 | 12610 | | ORI | #2 |
| 0400 | FC08 | 12620 | | ADI | #8 |
| 0402 | AA | 12630 | | PLO | UTILP2 |
| 0403 | FA18 | 12640 | | ANI | #18 |
| 0405 | C2040F | 12650 | | LBZ | SET |
| 0408 | 0A | 12660 | | LDN | UTILP2 |
| 0409 | C203FB | 12670 | | LBZ | LASTCK |
| 040C | C00417 | 12680 | | LBR | NOTLAST |
| 040F | 8A | 12690 | SET | GLO | UTILP2 |
| 0410 | FF08 | 12700 | | SMI | #8 |
| 0412 | AA | 12710 | | PLO | UTILP2 |
| 0413 | 97 | 12720 | | GHI | FLAG |
| 0414 | F920 | 12730 | | ORI | LASTN |
| 0416 | B7 | 12740 | | PHI | FLAG |
| 0417 | 87 | 12750 | NOTLAST | GLO | FLAG |
| 0418 | FAFE | 12760 | | ANI | NDNF |
| 041A | C00424 | 12770 | | LBR | BIT |
| 041D | 97 | 12780 | DY | GHI | FLAG |
| 041E | FADF | 12790 | | ANI | NLASTN |
| 0420 | B7 | 12800 | | PHI | FLAG |

| | | | | | |
|---|---|---|---|---|---|
| 0421 | 87 | 12810 | | GLO | FLAG |
| 0422 | F903 | 12820 | | ORI | DNFIC |
| 0424 | A7 | 12830 | PUT | PLO | FLAG |
| 0425 | 8A | 12840 | | GLO | UTILP2 |
| 0426 | FA1C | 12850 | | ANI | #1C |
| 0428 | E2 | 12860 | | SEX | SP |
| 0429 | CA045A | 12870 | | LBNZ | AUTO |
| 042C | 69 | 12880 | | INP | SWOPT |
| 042D | FA02 | 12890 | | ANI | AUTMSK |
| 042F | CA0551 | 12900 | | LBNZ | BUTTON |
| 0432 | F800 | 12910 | | LDI | A.0/DAYDIF |
| 0434 | AE | 12920 | | PLO | UTILP1 |
| 0435 | F8A0 | 12930 | | LDI | A.1/DAYDIF |
| 0437 | BE | 12940 | | PHI | UTILP1 |
| 0438 | 0E | 12950 | | LDN | UTILP1 |
| 0439 | C20551 | 12960 | | LBZ | BUTTON |
| 043C | F854 | 12970 | | LDI | A.0/A-D |
| 043E | A5 | 12980 | | PLO | SUBSUB |
| 043F | F80C | 12990 | | LDI | A.1/A-D |
| 0441 | B5 | 13000 | | PHI | SUBSUB |
| 0442 | F8F7 | 13010 | | LDI | MANRST |
| 0444 | D5 | 13020 | | SEP | SUBSUB |
| 0445 | 02 | 13030 | | LDN | SP |
| 0446 | F6 | 13040 | | SHR | |
| 0447 | AC | 13050 | | PLO | BSTMR |
| 0448 | 87 | 13060 | | GLO | FLAG |
| 0449 | F910 | 13070 | | ORI | BBMSK |
| 044B | A7 | 13080 | | PLO | FLAG |
| 044C | F800 | 13090 | | LDI | #0 |
| 044E | A8 | 13100 | | PLO | CYCTMR |
| 044F | B8 | 13110 | | PHI | CYCTMR |
| 0450 | C00551 | 13120 | | LBR | BUTTON |
| 0453 | 2A | 13130 | NOCOIN | DEC | UTILP2 |
| 0454 | 9A | 13140 | | GHI | UTILP2 |
| 0455 | FA10 | 13150 | | ANI | #10 |
| 0457 | C203EF | 13160 | | LBZ | PRIM,-6 |
| 045A | 8C | 13170 | AUTO | GLO | BSTMR |
| 045B | CA0551 | 13180 | | LBNZ | BUTTON |
| 045E | E2 | 13190 | | SEX | SP |
| 045F | 69 | 13200 | | INP | SWOPT |
| 0460 | FA02 | 13210 | | ANI | AUTMSK |
| 0462 | C20551 | 13220 | | LBZ | BUTTON |
| 0465 | 8A | 13230 | | GLO | UTILP2 |
| 0466 | FAE0 | 13240 | | ANI | #E0 |
| 0468 | F903 | 13250 | | ORI | #3 |
| 046A | AA | 13260 | | PLO | UTILP2 |
| 046B | F8E3 | 13270 | | LDI | A.0/TIME,+3 |
| 046D | AE | 13280 | | PLO | UTILP1 |
| 046E | 7B | 13290 | | SEQ | |
| 046F | 0E | 13300 | OPTCAL | LDN | UTILP1 |
| 0470 | EA | 13310 | | SEX | UTILP2 |
| 0471 | F5 | 13320 | | SD | |
| 0472 | CB054E | 13330 | | LBNF | CALEX |
| 0475 | 2E | 13340 | | DEC | UTILP1 |

| | | | | |
|---|---|---|---|---|
| 0476 | 2A | 13350 | DEC | UTILP2 |
| 0477 | A0 | 13360 | PLO | TEMP |
| 0478 | 0A | 13370 | LDN | UTILP2 |
| 0479 | C2054E | 13380 | LBZ | CALEX |
| 047C | 80 | 13390 | GLO | TEMP |
| 047D | CE | 13400 | LSZ | |
| 047E | F80C | 13410 | LDI | #C |
| 0480 | F4 | 13420 | ADD | |
| 0481 | FF18 | 13430 | SMI | #18 |
| 0483 | CE | 13440 | LSZ | |
| 0484 | FC0C | 13450 | ADI | #C |
| 0486 | FC0C | 13460 | ADI | #C |
| 0488 | E2 | 13470 | SEX | SP |
| 0489 | 52 | 13480 | STR | SP |
| 048A | 0E | 13490 | LDN | UTILP1 |
| 048B | FF0C | 13500 | SMI | #C |
| 048D | CE | 13510 | LSZ | |
| 048E | FC0C | 13520 | ADI | #C |
| 0490 | F5 | 13530 | SD | |
| 0491 | CB054E | 13540 | LBNF | CALEX |
| 0494 | 52 | 13550 | STR | SP |
| 0495 | FF04 | 13560 | SMI | #4 |
| 0497 | C3054E | 13570 | LBDF | CALEX |
| 049A | 02 | 13580 | LDN | SP |
| 049B | FE | 13590 | SHL | |
| 049C | 52 | 13600 | STR | SP |
| 049D | FE | 13610 | SHL | |
| 049E | F4 | 13620 | ADD | |
| 049F | 52 | 13630 | STR | SP |
| 04A0 | 2E | 13640 | DEC | UTILP1 |
| 04A1 | 2A | 13650 | DEC | UTILP2 |
| 04A2 | EA | 13660 | SEX | UTILP2 |
| 04A3 | 0E | 13670 | LDN | UTILP1 |
| 04A4 | F5 | 13680 | SD | |
| 04A5 | E2 | 13690 | SEX | SP |
| 04A6 | F4 | 13700 | ADD | |
| 04A7 | FE | 13710 | SHL | |
| 04A8 | 52 | 13720 | STR | SP |
| 04A9 | FE | 13730 | SHL | |
| 04AA | FE | 13740 | SHL | |
| 04AB | F4 | 13750 | ADD | |
| 04AC | 52 | 13760 | STR | SP |
| 04AD | 2E | 13770 | DEC | UTILP1 |
| 04AE | 2A | 13780 | DEC | UTILP2 |
| 04AF | EA | 13790 | SEX | UTILP2 |
| 04B0 | 0E | 13800 | LDN | UTILP1 |
| 04B1 | F5 | 13810 | SD | |
| 04B2 | E2 | 13820 | SEX | SP |
| 04B3 | F4 | 13830 | ADD | |
| 04B4 | 73 | 13840 | STXD | |
| 04B5 | FFB5 | 13850 | SMI | #.181 |
| 04B7 | C3054D | 13860 | LBDF | SPCORR |
| 04BA | F803 | 13870 | LDI | A.0/TEMPOUT |
| 04BC | AE | 13880 | PLO | UTILP1 |
| 04BD | F8A0 | 13890 | LDI | A.1/TEMPOUT |
| 04BF | BE | 13900 | PHI | UTILP1 |

| | | | | | |
|---|---|---|---|---|---|
| 04C0 | EE | 13910 | | SEX | UTILP1 |
| 04C1 | F855 | 13920 | | LDI | #.85 |
| 04C3 | F7 | 13930 | | SM | |
| 04C4 | CF | 13940 | | LSDF | |
| 04C5 | F800 | 13950 | | LDI | #0 |
| 04C7 | B9 | 13960 | | PHI | MQ |
| 04C8 | F800 | 13970 | | LDI | #0 |
| 04CA | A9 | 13980 | | PLO | MQ |
| 04CB | E2 | 13990 | | SEX | SP |
| 04CC | F854 | 14000 | KFACT | LDI | A.0/A-D |
| 04CE | A5 | 14010 | | PLO | SUBSUB |
| 04CF | F80C | 14020 | | LDI | A.1/A-D |
| 04D1 | B5 | 14030 | | PHI | SUBSUB |
| 04D2 | F8FE | 14040 | | LDI | AUTRST |
| 04D4 | D5 | 14050 | | SEP | SUBSUB |
| 04D5 | 02 | 14060 | | LDN | SP |
| 04D6 | F6 | 14070 | | SHR | |
| 04D7 | F6 | 14080 | | SHR | |
| 04D8 | 52 | 14090 | | STR | SP |
| 04D9 | F854 | 14100 | | LDI | #.84 |
| 04DB | F7 | 14110 | | SM | |
| 04DC | 52 | 14120 | | STR | SP |
| 04DD | 99 | 14130 | | GHI | MQ |
| 04DE | F7 | 14140 | | SM | |
| 04DF | C304FE | 14150 | | LBDF | LONG |
| 04E2 | F88A | 14160 | | LDI | A.0/DIV |
| 04E4 | A5 | 14170 | | PLO | SUBSUB |
| 04E5 | F80C | 14180 | | LDI | A.1/DIV |
| 04E7 | B5 | 14190 | | PHI | SUBSUB |
| 04E8 | D5 | 14200 | | SEP | SUBSUB |
| 04E9 | 89 | 14210 | | GLO | MQ |
| 04EA | 52 | 14220 | | STR | SP |
| 04EB | F86F | 14230 | | LDI | A.0/MULT |
| 04ED | A5 | 14240 | | PLO | SUBSUB |
| 04EE | F80C | 14250 | | LDI | A.1/MULT |
| 04F0 | B5 | 14260 | | PHI | SUBSUB |
| 04F1 | D5 | 14270 | | SEP | SUBSUB |
| 04F2 | 99 | 14280 | | GHI | MQ |
| 04F3 | A9 | 14290 | | PLO | MQ |
| 04F4 | F8B4 | 14300 | | LDI | #.180 |
| 04F6 | 52 | 14310 | | STR | SP |
| 04F7 | D5 | 14320 | | SEP | SUBSUB |
| 04F8 | 99 | 14330 | | GHI | MQ |
| 04F9 | FFB4 | 14340 | | SMI | #.180 |
| 04FB | CF | 14350 | | LSDF | |
| 04FC | 99 | 14360 | | GHI | MQ |
| 04FD | C8 | 14370 | | LSKP | |
| 04FE | F8B4 | 14380 | LONG | LDI | #.180 |
| 0500 | 12 | 14390 | | INC | SP |
| 0501 | C9053E | 14400 | | LBNQ | OPEX |
| 0504 | F7 | 14410 | | SM | |
| 0505 | CB0512 | 14420 | | LBNF | OPTSD |
| 0508 | 02 | 14430 | | LDN | SP |
| 0509 | AC | 14440 | | PLO | RSTMR |
| 050A | F800 | 14450 | | LDI | #0 |
| 050C | B8 | 14460 | | PHI | CYCTMR |

| | | | | | |
|---|---|---|---|---|---|
| 050D | A8 | 14470 | | PLO | CYCTMR |
| 050E | 87 | 14480 | | GLO | FLAG |
| 050F | F913 | 14490 | | ORI | #13 |
| 0511 | A7 | 14500 | | PLO | FLAG |
| 0512 | 7A | 14510 | OPTSD | REQ | |
| 0513 | E2 | 14520 | | SEX | SP |
| 0514 | 69 | 14530 | | INP | SWOPT |
| 0515 | FA01 | 14540 | | ANI | OPT |
| 0517 | C20551 | 14550 | | LBZ | BUTTON |
| 051A | 87 | 14560 | | GLO | FLAG |
| 051B | FA01 | 14570 | | ANI | DNF |
| 051D | C20551 | 14580 | | LBZ | BUTTON |
| 0520 | 8A | 14590 | | GLO | UTILP2 |
| 0521 | FAE0 | 14600 | | ANI | #E0 |
| 0523 | F91E | 14610 | | ORI | #1E |
| 0525 | AA | 14620 | | PLO | UTILP2 |
| 0526 | 0A | 14630 | | LDN | UTILP2 |
| 0527 | CA0537 | 14640 | | LBNZ | *,+16 |
| 052A | 8A | 14650 | | GLO | UTILP2 |
| 052B | FF08 | 14660 | | SMI | #8 |
| 052D | AA | 14670 | | PLO | UTILP2 |
| 052E | FA18 | 14680 | | ANI | #18 |
| 0530 | FB18 | 14690 | | XRI | #18 |
| 0532 | CA0526 | 14700 | | LBNZ | *,-12 |
| 0535 | 3051 | 14710 | | BR | BUTTON |
| 0537 | 1A | 14720 | | INC | UTILP2 |
| 0538 | F8E3 | 14730 | | LDI | A.0/TIME,+3 |
| 053A | AE | 14740 | | PLO | UTILP1 |
| 053B | C0046F | 14750 | | LBR | OPTCAL |
| 053E | FDB4 | 14760 | OPEX | SDI | #.180 |
| 0540 | F7 | 14770 | | SM | |
| 0541 | 3B51 | 14780 | | BNF | BUTTON |
| 0543 | 87 | 14790 | | GLO | FLAG |
| 0544 | FAFE | 14800 | | ANI | NDNF |
| 0546 | A7 | 14810 | | PLO | FLAG |
| 0547 | 97 | 14820 | | GHI | FLAG |
| 0548 | F920 | 14830 | | ORI | LASTN |
| 054A | B7 | 14840 | | PHI | FLAG |
| 054B | 3051 | 14850 | | BR | BUTTON |
| 054D | 12 | 14860 | SPCORR | INC | SP |
| 054E | C10512 | 14870 | CALEX | LBQ | OPTSD |
| 0551 | F2 | 20010 | BUTTON | SEX | SP |
| 0552 | 6E | 20020 | | INP | SW |
| 0553 | FA08 | 20030 | | ANI | MANUAL |
| 0555 | CA06F0 | 20040 | | LBNZ | BEX |
| 0558 | 9B | 20050 | | GHI | SYNC |
| 0559 | FA01 | 20060 | | ANI | #1 |
| 055B | CA06F0 | 20070 | | LBNZ | BEX |
| 055E | 6E | 20080 | | INP | SW |
| 055F | FA80 | 20090 | | ANI | COAL |
| 0561 | C2059E | 20100 | | LBZ | NOCOAL |
| 0564 | F8ED | 20110 | | LDI | A.0/STON |
| 0566 | AE | 20120 | | PLO | UTILP1 |
| 0567 | F830 | 20130 | | LDI | A.1/STON |
| 0569 | BE | 20140 | | PHI | UTILP1 |
| 056A | F0 | 20150 | | LDX | |

| | | | | |
|---|---|---|---|---|
| 056B | FA03 | 20160 | ANI | #3 |
| 056D | C6 | 20170 | LSNZ | |
| 056E | 1E | 20180 | INC | UTILP1 |
| 056F | 1E | 20190 | INC | UTILP1 |
| 0570 | 3277 | 20200 | BZ | *,+7 |
| 0572 | FB03 | 20210 | XRI | #3 |
| 0574 | CA059E | 20220 | LBNZ | NOCOAL |
| 0577 | 6D | 20230 | INP | PB |
| 0578 | FA82 | 20240 | ANI | MCLMSK |
| 057A | C2064D | 20250 | LBZ | NOBUT |
| 057D | 87 | 20260 | GLO | FLAG |
| 057E | FA40 | 20270 | ANI | BMSK |
| 0580 | CA06F0 | 20280 | LBNZ | BEX |
| 0583 | 87 | 20290 | GLO | FLAG |
| 0584 | F940 | 20300 | ORI | BMSK |
| 0586 | A7 | 20310 | PLO | FLAG |
| 0587 | F0 | 20320 | LDX | |
| 0588 | FA02 | 20330 | ANI | MMSK |
| 058A | 3296 | 20340 | BZ | ZRO |
| 058C | F8B3 | 20350 | LDI | A.0/INCMIN |
| 058E | A5 | 20360 | PLO | SUBSUB |
| 058F | F80D | 20370 | LDI | A.1/INCMIN |
| 0591 | B5 | 20380 | PHI | SUBSUB |
| 0592 | D5 | 20390 | SEP | SUBSUB |
| 0593 | C006F0 | 20400 | LBR | BEX |
| 0596 | F800 | 20410 ZRO | LDI | #0 |
| 0598 | 5E | 20420 | STR | UTILP1 |
| 0599 | 1E | 20430 | INC | UTILP1 |
| 059A | 5E | 20440 | STR | UTILP1 |
| 059B | C006F0 | 20450 | LBR | BEX |
| 059E | 6D | 20460 NOCOAL | INP | PB |
| 059F | FA04 | 20470 | ANI | PGMSK |
| 05A1 | 3AAC | 20480 | BNZ | PGM |
| 05A3 | F8E0 | 20490 | LDI | A.0/TIME |
| 05A5 | AF | 20500 | PLO | RF |
| 05A6 | F830 | 20510 | LDI | A.1/TIME |
| 05A8 | BF | 20520 | PHI | RF |
| 05A9 | C00635 | 20530 | LBR | RDHM |
| 05AC | 8F | 20540 PGM | GLO | RF |
| 05AD | FBE0 | 20550 | XRI | A.0/TIME |
| 05AF | 3AB4 | 20560 | BNZ | *,+5 |
| 05B1 | F800 | 20570 | LDI | #0 |
| 05B3 | AF | 20580 | PLO | RF |
| 05B4 | F0 | 20590 | LDX | |
| 05B5 | FA89 | 20600 | ANI | CCRMSK |
| 05B7 | C20648 | 20610 | LBZ | DHM |
| 05BA | 87 | 20620 | GLO | FLAG |
| 05BB | FA40 | 20630 | ANI | BMSK |
| 05BD | CA06F0 | 20640 | LBNZ | BEX |
| 05C0 | 87 | 20650 | GLO | FLAG |
| 05C1 | F940 | 20660 | ORI | BMSK |
| 05C3 | A7 | 20670 | PLO | FLAG |
| 05C4 | F0 | 20680 | LDX | |
| 05C5 | FA80 | 20690 | ANI | CLMSK |
| 05C7 | 32D9 | 20700 | BZ | COPY |
| 05C9 | 8F | 20710 | GLO | RF |

| | | | | |
|---|---|---|---|---|
| 0625 | C006F0 | 21280 | LBR | BEX |
| 0628 | F830 | 21290 RVW3 | LDI | A.1/RAM |
| 062A | BF | 21300 | PHI | RF |
| 062B | 8F | 21310 RVW2 | GLO | RF |
| 062C | FFE0 | 21320 | SMI | #E0 |
| 062E | CF | 21330 | LSDF | |
| 062F | FCE0 | 21340 | ADI | #E0 |
| 0631 | AF | 21350 | PLO | RF |
| 0632 | C006F0 | 21360 | LBR | BEX |
| 0635 | F0 | 21370 RDHM | LDX | |
| 0636 | FA7A | 21380 | ANI | RDHMSK |
| 0638 | C2064D | 21390 | LBZ | NOBUT |
| 063B | 87 | 21400 | GLO | FLAG |
| 063C | FA40 | 21410 | ANI | BMSK |
| 063E | CA06F0 | 21420 | LBNZ | BEX |
| 0641 | 87 | 21430 | GLO | FLAG |
| 0642 | F940 | 21440 | ORI | BMSK |
| 0644 | A7 | 21450 | PLO | FLAG |
| 0645 | C0065E | 21460 | LBR | SHFT |
| 0648 | F0 | 21470 DHM | LDX | |
| 0649 | FA72 | 21480 | ANI | DHMSK |
| 064B | 3A54 | 21490 | BNZ | *,+9 |
| 064D | 87 | 21500 NOBUT | GLO | FLAG |
| 064E | FABF | 21510 | ANI | NBMSK |
| 0650 | A7 | 21520 | PLO | FLAG |
| 0651 | C006F0 | 21530 | LBR | BEX |
| 0654 | 87 | 21540 | GLO | FLAG |
| 0655 | FA40 | 21550 | ANI | BMSK |
| 0657 | CA06F0 | 21560 | LBNZ | BEX |
| 065A | 87 | 21570 | GLO | FLAG |
| 065B | F940 | 21580 | ORI | BMSK |
| 065D | A7 | 21590 | PLO | FLAG |
| 065E | F0 | 21600 SHFT | LDX | |
| 065F | FA20 | 21610 | ANI | SMSK |
| 0661 | C20694 | 21620 | LBZ | DAY |
| 0664 | 8C | 21630 | GLO | BSTMR |
| 0665 | CA0694 | 21640 | LBNZ | DAY |
| 0668 | 87 | 21650 | GLO | FLAG |
| 0669 | FA02 | 21660 | ANI | DNFC |
| 066B | CA0682 | 21670 | LBNZ | NITE2 |
| 066E | 87 | 21680 | GLO | FLAG |
| 066F | F902 | 21690 | ORI | DNFC |
| 0671 | A7 | 21700 | PLO | FLAG |
| 0672 | F0 | 21710 | LDX | |
| 0673 | FA04 | 21720 | ANI | PGMSK |
| 0675 | 327D | 21730 | BZ | *,+8 |
| 0677 | 87 | 21740 | GLO | FLAG |
| 0678 | F901 | 21750 | ORI | DNF |
| 067A | C00690 | 21760 | LBR | BSTCL |
| 067D | F85A | 21770 | LDI | #.90 |
| 067F | C00693 | 21780 | LBR | BSTCL,+3 |
| 0682 | F0 | 21790 NITE2 | LDX | |
| 0683 | FA04 | 21800 | ANI | PGMSK |
| 0685 | C2068D | 21810 | LBZ | *,+8 |
| 0688 | 87 | 21820 | GLO | FLAG |
| 0689 | FAFE | 21830 | ANI | NDNF |

| | | | | |
|---|---|---|---|---|
| 05CA | F907 | 20720 | ORI | #7 |
| 05CC | AF | 20730 | PLO | RF |
| 05CD | F800 | 20740 | LDI | #0 |
| 05CF | 5F | 20750 | STR | RF |
| 05D0 | 8F | 20760 | GLO | RF |
| 05D1 | FA07 | 20770 | ANI | #7 |
| 05D3 | C206F0 | 20780 | LBZ | BEX |
| 05D6 | 2F | 20790 | DEC | RF |
| 05D7 | 30CD | 20800 | BR | *,-10 |
| 05D9 | F0 | 20810 COPY | LDX | |
| 05DA | FA01 | 20820 | ANI | CMSK |
| 05DC | C2060B | 20830 | LBZ | RVW |
| 05DF | 8F | 20840 | GLO | RF |
| 05E0 | FAE0 | 20850 | ANI | #E0 |
| 05E2 | C206F0 | 20860 | LBZ | BEX |
| 05E5 | EF | 20870 | SEX | RF |
| 05E6 | F860 | 20880 | LDI | A.1/RAM2 |
| 05E8 | BF | 20890 | PHI | RF |
| 05E9 | 8F | 20900 COPLP | GLO | RF |
| 05EA | F91F | 20910 | ORI | #1F |
| 05EC | AF | 20920 | PLO | RF |
| 05ED | FF20 | 20930 | SMI | #20 |
| 05EF | AE | 20940 | PLO | UTILP1 |
| 05F0 | 9F | 20950 | GHI | RF |
| 05F1 | BE | 20960 | PHI | UTILP1 |
| 05F2 | 0E | 20970 COPLP2 | LDN | UTILP1 |
| 05F3 | 73 | 20980 | STXD | |
| 05F4 | 8E | 20990 | GLO | UTILP1 |
| 05F5 | 2E | 21000 | DEC | UTILP1 |
| 05F6 | FA1F | 21010 | ANI | #1F |
| 05F8 | 3AF2 | 21020 | BNZ | COPLP2 |
| 05FA | 9F | 21030 | GHI | RF |
| 05FB | FA10 | 21040 | ANI | #10 |
| 05FD | CA06F0 | 21050 | LBNZ | BEX |
| 0600 | F830 | 21060 | LDI | A.1/RAM |
| 0602 | BF | 21070 | PHI | RF |
| 0603 | 1E | 21080 | INC | UTILP1 |
| 0604 | 1F | 21090 | INC | RF |
| 0605 | C005E9 | 21100 | LBR | COPLP |
| 0608 | 8F | 21110 RVW | GLO | RF |
| 0609 | FC04 | 21120 | ADI | #4 |
| 060B | AF | 21130 | PLO | RF |
| 060C | 69 | 21140 | INP | SWOPT |
| 060D | FA10 | 21150 | ANI | AUXSET |
| 060F | C2062B | 21160 | LBZ | RVW2 |
| 0612 | 8F | 21170 | GLO | RF |
| 0613 | FA1E | 21180 | ANI | #1E |
| 0615 | CA06F0 | 21190 | LBNZ | BEX |
| 0618 | 9F | 21200 | GHI | RF |
| 0619 | FA10 | 21210 | ANI | #10 |
| 061B | C20628 | 21220 | LBZ | RVW3 |
| 061E | F860 | 21230 | LDI | A.1/RAM2 |
| 0620 | BF | 21240 | PHI | RF |
| 0621 | 8F | 21250 | GLO | RF |
| 0622 | FF20 | 21260 | SMI | #20 |
| 0624 | AF | 21270 | PLO | RF |

| | | | | | |
|---|---|---|---|---|---|
| 068B | 3090 | 21840 | | BR | BSTCL |
| 068D | 87 | 21850 | | GLO | FLAG |
| 068E | FAFD | 21860 | | ANI | NDNFC |
| 0690 | A7 | 21870 | BSTCL | PLO | FLAG |
| 0691 | F800 | 21880 | | LDI | #0 |
| 0693 | BC | 21890 | | PHI | H1.5H |
| 0694 | F0 | 21900 | DAY | LDX | |
| 0695 | FA10 | 21910 | | ANI | DMSK |
| 0697 | 32BE | 21920 | | BZ | HRS |
| 0699 | F0 | 21930 | | LDX | |
| 069A | FA04 | 21940 | | ANI | PGMSK |
| 069C | 32AC | 21950 | | BZ | DOW |
| 069E | 8F | 21960 | | GLO | RF |
| 069F | FAE0 | 21970 | | ANI | #E0 |
| 06A1 | FFC0 | 21980 | | SMI | #C0 |
| 06A3 | CF | 21990 | | LSDF | |
| 06A4 | FCE0 | 22000 | | ADI | #E0 |
| 06A6 | AF | 22010 | | PLO | RF |
| 06A7 | F830 | 22020 | | LDI | A.1/RAM |
| 06A9 | BF | 22030 | | PHI | RF |
| 06AA | 30F0 | 22040 | | BR | REX |
| 06AC | F8EC | 22050 | DOW | LDI | A.0/INCDAY |
| 06AE | A5 | 22060 | | PLO | SUBSUB |
| 06AF | F80D | 22070 | | LDI | A.1/INCDAY |
| 06B1 | B5 | 22080 | | PHI | SUBSUB |
| 06B2 | D5 | 22090 | | SEP | SUBSUB |
| 06B3 | F8A8 | 22100 | | LDI | A.0/SUB4 |
| 06B5 | A5 | 22110 | | PLO | SUBSUB |
| 06B6 | F80C | 22120 | | LDI | A.1/SUB4 |
| 06B8 | B5 | 22130 | | PHI | SUBSUB |
| 06B9 | 22 | 22140 | | DEC | SP |
| 06BA | F8FF | 22150 | | LDI | #FF |
| 06BC | 52 | 22160 | | STR | SP |
| 06BD | D5 | 22170 | | SEP | SUBSUB |
| 06BE | 9F | 22180 | HRS | GHI | RF |
| 06BF | BE | 22190 | | PHI | UTILP1 |
| 06C0 | 8F | 22200 | | GLO | RF |
| 06C1 | AE | 22210 | | PLO | UTILP1 |
| 06C2 | 6D | 22220 | | INP | PB |
| 06C3 | FA40 | 22230 | | ANI | HMSK |
| 06C5 | 32D9 | 22240 | | BZ | MINS |
| 06C7 | F8CA | 22250 | | LDI | A.0/INCHRS |
| 06C9 | A5 | 22260 | | PLO | SUBSUB |
| 06CA | F80D | 22270 | | LDI | A.1/INCHRS |
| 06CC | B5 | 22280 | | PHI | SUBSUB |
| 06CD | D5 | 22290 | | SEP | SUBSUB |
| 06CE | F8A8 | 22300 | | LDI | A.0/SUB4 |
| 06D0 | A5 | 22310 | | PLO | SUBSUB |
| 06D1 | F80C | 22320 | | LDI | A.1/SUB4 |
| 06D3 | B5 | 22330 | | PHI | SUBSUB |
| 06D4 | F83C | 22340 | | LDI | #.60 |
| 06D6 | 22 | 22350 | | DEC | SP |
| 06D7 | 52 | 22360 | | STR | SP |
| 06D8 | D5 | 22370 | | SEP | SUBSUB |
| 06D9 | F0 | 22380 | MINS | LDX | |
| 06DA | FA02 | 22390 | | ANI | MMSK |

| | | | | | |
|---|---|---|---|---|---|
| 06DC | 32F0 | 22400 | | BZ | BEX |
| 06DE | F8B3 | 22410 | | LDI | A.0/INCMIN |
| 06E0 | A5 | 22420 | | PLO | SUBSUB |
| 06E1 | F80D | 22430 | | LDI | A.1/INCMIN |
| 06E3 | B5 | 22440 | | PHI | SUBSUB |
| 06E4 | D5 | 22450 | | SEP | SUBSUB |
| 06E5 | F8A8 | 22460 | | LDI | A.0/SUB4 |
| 06E7 | A5 | 22470 | | PLO | SUBSUB |
| 06E8 | F80C | 22480 | | LDI | A.1/SUB4 |
| 06EA | B5 | 22490 | | PHI | SUBSUB |
| 06EB | 22 | 22500 | | DEC | SP |
| 06EC | F801 | 22510 | | LDI | #1 |
| 06EE | 52 | 22520 | | STR | SP |
| 06EF | D5 | 22530 | | SEP | SUBSUB |
| 06F0 | D3 | 22540 | BEX | SEP | PC |
| 06F1 | EE | 22550 | DISSTP | SEX | UTILP1 |
| 06F2 | F80A | 22560 | | LDI | A.0/DISP,+5 |
| 06F4 | AE | 22570 | | PLO | UTILP1 |
| 06F5 | F8A0 | 22580 | | LDI | A.1/DISP,+5 |
| 06F7 | BE | 22590 | | PHI | UTILP1 |
| 06F8 | 6E | 22600 | | INP | SW |
| 06F9 | FA08 | 22610 | | ANI | MANUAL |
| 06FB | C2071B | 22620 | | LBZ | COALDIS |
| 06FE | F8E5 | 22630 | | LDI | A.0/ACCUM |
| 0700 | AA | 22640 | | PLO | UTILP2 |
| 0701 | FB30 | 22650 | | LDI | A.1/RAM |
| 0703 | BA | 22660 | | PHI | UTILP2 |
| 0704 | 1E | 22670 | | INC | UTILP1 |
| 0705 | 1E | 22680 | | INC | UTILP1 |
| 0706 | 4A | 22690 | | LDA | UTILP2 |
| 0707 | 73 | 22700 | | STXD | |
| 0708 | 4A | 22710 | | LDA | UTILP2 |
| 0709 | 73 | 22720 | | STXD | |
| 070A | 4A | 22730 | | LDA | UTILP2 |
| 070B | 73 | 22740 | | STXD | |
| 070C | 4A | 22750 | | LDA | UTILP2 |
| 070D | 73 | 22760 | | STXD | |
| 070E | 4A | 22770 | | LDA | UTILP2 |
| 070F | 73 | 22780 | | STXD | |
| 0710 | 4A | 22790 | | LDA | UTILP2 |
| 0711 | 73 | 22800 | | STXD | |
| 0712 | F8FF | 22810 | | LDI | #FF |
| 0714 | 73 | 22820 | | STXD | |
| 0715 | F807 | 22830 | | LDI | #7 |
| 0717 | 73 | 22840 | | STXD | |
| 0718 | C0088B | 22850 | | LBR | DCD |
| 071B | 6E | 22860 | COALDIS | INP | SW |
| 071C | FA80 | 22870 | | ANI | COAL |
| 071E | C20760 | 22880 | | LBZ | AUMTC |
| 0721 | F0 | 22890 | | LDX | |
| 0722 | FA03 | 22900 | | ANI | #3 |
| 0724 | C2072C | 22910 | | LBZ | CNTU |
| 0727 | FB03 | 22920 | | XRI | #3 |
| 0729 | CA0760 | 22930 | | LBNZ | AUMTC |
| 072C | F8ED | 22940 | CNTU | LDI | A.0/STON |
| 072E | AA | 22950 | | PLO | UTILP2 |

| | | | | | |
|---|---|---|---|---|---|
| 072F | F830 | 22960 | | LDI | A.1/STON |
| 0731 | BA | 22970 | | PHI | UTILP2 |
| 0732 | F0 | 22980 | | LDX | |
| 0733 | FA03 | 22990 | | ANI | #3 |
| 0735 | C6 | 23000 | | LSNZ | |
| 0736 | 1A | 23010 | | INC | UTILP2 |
| 0737 | 1A | 23020 | | INC | UTILP2 |
| 0738 | CA0744 | 23030 | | LBNZ | DISON |
| 073B | F811 | 23040 | | LDI | VF |
| 073D | 73 | 23050 | | STXD | |
| 073E | 73 | 23060 | | STXD | |
| 073F | F800 | 23070 | | LDI | V0 |
| 0741 | C0074C | 23080 | | LBR | DISOFF |
| 0744 | F80E | 23090 | DISON | LDI | VN |
| 0746 | 73 | 23100 | | STXD | |
| 0747 | F800 | 23110 | | LDI | V0 |
| 0749 | 73 | 23120 | | STXD | |
| 074A | F80A | 23130 | | LDI | #A |
| 074C | 73 | 23140 | DISOFF | STXD | |
| 074D | F80A | 23150 | | LDI | #A |
| 074F | 73 | 23160 | | STXD | |
| 0750 | F8FF | 23170 | | LDI | #FF |
| 0752 | 73 | 23180 | | STXD | |
| 0753 | F807 | 23190 | | LDI | #7 |
| 0755 | 73 | 23200 | | STXD | |
| 0756 | F80C | 23210 | | LDI | A.0/DISP,+7 |
| 0758 | AE | 23220 | | PLO | UTILP1 |
| 0759 | 4A | 23230 | | LDA | UTILP2 |
| 075A | 73 | 23240 | | STXD | |
| 075B | 4A | 23250 | | LDA | UTILP2 |
| 075C | 73 | 23260 | | STXD | |
| 075D | C0088B | 23270 | | LBR | DCD |
| 0760 | 4F | 23280 | AUMTC | LDA | RF |
| 0761 | 73 | 23290 | | STXD | |
| 0762 | 4F | 23300 | | LDA | RF |
| 0763 | 73 | 23310 | | STXD | |
| 0764 | 0F | 23320 | | LDN | RF |
| 0765 | CA077D | 23330 | | LBNZ | HRDEC |
| 0768 | 1F | 23340 | | INC | RF |
| 0769 | 60 | 23350 | | IRX | |
| 076A | 60 | 23360 | | IRX | |
| 076B | F80D | 23370 | | LDI | VE |
| 076D | 73 | 23380 | | STXD | |
| 076E | F80E | 23390 | | LDI | VR |
| 0770 | 73 | 23400 | | STXD | |
| 0771 | F800 | 23410 | | LDI | V0 |
| 0773 | 73 | 23420 | | STXD | |
| 0774 | F80E | 23430 | | LDI | VN |
| 0776 | 73 | 23440 | | STXD | |
| 0777 | F8FF | 23450 | | LDI | #FF |
| 0779 | 73 | 23460 | | STXD | |
| 077A | C007D3 | 23470 | | LBR | DAY2 |
| 077D | 9D | 23480 | HRDEC | GHI | HZCNTR |
| 077E | 76 | 23490 | | SHRC | |
| 077F | 97 | 23500 | | GHI | FLAG |
| 0780 | CF | 23510 | | LSDF | |

| | | | | | |
|---|---|---|---|---|---|
| 0781 | F902 | 23520 | | ORI | COLONBIT |
| 0783 | B7 | 23530 | | PHI | FLAG |
| 0784 | 6E | 23540 | | INP | SW |
| 0785 | FA20 | 23550 | | ANI | 14HR |
| 0787 | C207AD | 23560 | | LBZ | TWLV |
| 078A | 1F | 23570 | | INC | RF |
| 078B | 0F | 23580 | | LDN | RF |
| 078C | 2F | 23590 | | DEC | RF |
| 078D | 3299 | 23600 | | BZ | MID |
| 078F | 4F | 23610 | | LDA | RF |
| 0790 | FF0C | 23620 | | SMI | #.12 |
| 0792 | FC0C | 23630 | | ADI | #.12 |
| 0794 | C7 | 23640 | | LSNF | |
| 0795 | FC0C | 23650 | | ADI | #.12 |
| 0797 | 30AE | 23660 | | BR | TWLV+1 |
| 0799 | 4F | 23670 | MID | LDA | RF |
| 079A | FF0C | 23680 | | SMI | #.12 |
| 079C | FC0C | 23690 | | ADI | #.12 |
| 079E | 33AE | 23700 | | BDF | TWLV+1 |
| 07A0 | 1E | 23710 | | INC | UTILP1 |
| 07A1 | 4E | 23720 | | LDA | UTILP1 |
| 07A2 | F4 | 23730 | | ADD | |
| 07A3 | 2E | 23740 | | DEC | UTILP1 |
| 07A4 | 2E | 23750 | | DEC | UTILP1 |
| 07A5 | FF01 | 23760 | | SMI | #1 |
| 07A7 | F818 | 23770 | | LDI | #.24 |
| 07A9 | C7 | 23780 | | LSNF | |
| 07AA | F800 | 23790 | | LDI | #0 |
| 07AC | 38 | 23800 | | SKP | |
| 07AD | 4F | 23810 | TWLV | LDA | RF |
| 07AE | FF0A | 23820 | | SMI | #A |
| 07B0 | 33BB | 23830 | | BDF | OV19 |
| 07B2 | FC0A | 23840 | | ADI | #A |
| 07B4 | 73 | 23850 | | STXD | |
| 07B5 | CE | 23860 | | LSZ | |
| 07B6 | F80A | 23870 | | LDI | #A |
| 07B8 | 73 | 23880 | | STXD | |
| 07B9 | 30CB | 23890 | | BR | APM |
| 07BB | FF0A | 23900 | OV19 | SMI | #A |
| 07BD | 3BC5 | 23910 | | BNF | OV9 |
| 07BF | 73 | 23920 | | STXD | |
| 07C0 | F802 | 23930 | | LDI | #2 |
| 07C2 | 73 | 23940 | | STXD | |
| 07C3 | 30CB | 23950 | | BR | APM |
| 07C5 | FC0A | 23960 | OV9 | ADI | #A |
| 07C7 | 73 | 23970 | | STXD | |
| 07C8 | F801 | 23980 | | LDI | #1 |
| 07CA | 73 | 23990 | | STXD | |
| 07CB | 0F | 24000 | APM | LDN | RF |
| 07CC | 76 | 24010 | | SHRC | |
| 07CD | F8EF | 24020 | | LDI | PM |
| 07CF | CF | 24030 | | LSDF | |
| 07D0 | F8DF | 24040 | | LDI | AM |
| 07D2 | 73 | 24050 | | STXD | |
| 07D3 | 8F | 24060 | DAY2 | GLO | RF |

| | | | | | |
|---|---|---|---|---|---|
| 07D4 | FFE3 | 24070 | | SMI | A.0/TIME,+3 |
| 07D6 | CA0863 | 24080 | | LBNZ | 1D |
| 07D9 | 1F | 24090 | | INC | RF |
| 07DA | 0F | 24100 | | LDN | RF |
| 07DB | 5F | 24110 | | STR | UTILP1 |
| 07DC | F8E0 | 24120 | | LDI | A.0/TIME |
| 07DE | AF | 24130 | | PLO | RF |
| 07DF | F80C | 24140 | SINE | LDI | A.0/DISP,+7 |
| 07E1 | AE | 24150 | | PLO | UTILP1 |
| 07E2 | E2 | 24160 | | SEX | SP |
| 07E3 | 6E | 24170 | | INP | SW |
| 07E4 | FA10 | 24180 | | ANI | RPDMSK |
| 07E6 | C207F0 | 24190 | | LBZ | INDRT |
| 07E9 | 98 | 24200 | | GHI | CYCTMR |
| 07EA | CE | 24210 | | LSZ | |
| 07EB | FF01 | 24220 | | SMI | #1 |
| 07ED | C00831 | 24230 | | LBR | DEC,-1 |
| 07F0 | F802 | 24240 | INDRT | LDI | A.0/TEMPIN |
| 07F2 | AA | 24250 | | PLO | UTILP2 |
| 07F3 | F8A0 | 24260 | | LDI | A.1/TEMPIN |
| 07F5 | BA | 24270 | | PHI | UTILP2 |
| 07F6 | 69 | 24280 | | INP | SWOPT |
| 07F7 | FA04 | 24290 | | ANI | IND |
| 07F9 | C2080F | 24300 | | LBZ | OUTD |
| 07FC | 69 | 24310 | | INP | SWOPT |
| 07FD | FA20 | 24320 | | ANI | CEL |
| 07FF | C20808 | 24330 | | LBZ | INF |
| 0802 | 0A | 24340 | | LDN | UTILP2 |
| 0803 | FF28 | 24350 | | SMI | #.40 |
| 0805 | C00831 | 24360 | | LBR | DEC,-1 |
| 0808 | 0A | 24370 | INF | LDN | UTILP2 |
| 0809 | F6 | 24380 | | SHR | |
| 080A | FC17 | 24390 | | ADI | #.23 |
| 080C | C00831 | 24400 | | LBR | DEC,-1 |
| 080F | 1A | 24410 | OUTD | INC | UTILP2 |
| 0810 | 69 | 24420 | | INP | SWOPT |
| 0811 | FA20 | 24430 | | ANI | CEL |
| 0813 | 321B | 24440 | | BZ | FNHT |
| 0815 | 0A | 24450 | | LDN | UTILP2 |
| 0816 | FF28 | 24460 | | SMI | #.40 |
| 0818 | C0081E | 24470 | | LBR | TD |
| 081B | 0A | 24480 | FNHT | LDN | UTILP2 |
| 081C | FF1E | 24490 | | SMI | #.30 |
| 081E | 5E | 24500 | TD | STR | UTILP1 |
| 081F | C30832 | 24510 | | LBDF | DEC |
| 0822 | F806 | 24520 | SIGN | LDI | A.0/DISP,+1 |
| 0824 | AE | 24530 | | PLO | UTILP1 |
| 0825 | 0E | 24540 | | LDN | UTILP1 |
| 0826 | FAFE | 24550 | | ANI | SGN |
| 0828 | 5E | 24560 | | STR | UTILP1 |
| 0829 | F80C | 24570 | | LDI | A.0/DISP,+7 |
| 082B | AE | 24580 | | PLO | UTILP1 |
| 082C | 0E | 24590 | | LDN | UTILP1 |
| 082D | FBFF | 24600 | | XRI | #FF |
| 082F | FC01 | 24610 | | ADI | #1 |
| 0831 | 5E | 24620 | | STR | UTILP1 |

| | | | | | |
|---|---|---|---|---|---|
| 0832 | EE | 24630 | DEC | SEX | UTILP1 |
| 0833 | F800 | 24640 | | LDI | #0 |
| 0835 | AB | 24650 | | PLO | UTIL |
| 0836 | 0E | 24660 | | LDN | UTILP1 |
| 0837 | FF0A | 24670 | | SMI | #A |
| 0839 | 1B | 24680 | | INC | UTIL |
| 083A | C30837 | 24690 | | LBDF | *,-3 |
| 083D | 2B | 24700 | | DEC | UTIL |
| 083E | FC0A | 24710 | | ADI | #A |
| 0840 | 73 | 24720 | | STXD | |
| 0841 | 8B | 24730 | | GLO | UTIL |
| 0842 | 5E | 24740 | | STR | UTILP1 |
| 0843 | F800 | 24750 | | LDI | #0 |
| 0845 | AB | 24760 | | PLO | UTIL |
| 0846 | 0E | 24770 | | LDN | UTILP1 |
| 0847 | FF0A | 24780 | | SMI | #A |
| 0849 | 1B | 24790 | | INC | UTIL |
| 084A | 3347 | 24800 | | BDF | *,-3 |
| 084C | 2B | 24810 | | DEC | UTIL |
| 084D | FC0A | 24820 | | ADI | #A |
| 084F | 5E | 24830 | | STR | UTILP1 |
| 0850 | 8B | 24840 | | GLO | UTIL |
| 0851 | 325D | 24850 | | BZ | U99 |
| 0853 | 8D | 24860 | | GLO | HZCNTR |
| 0854 | FA20 | 24870 | | ANI | #20 |
| 0856 | 325D | 24880 | | BZ | U99 |
| 0858 | 1E | 24890 | | INC | UTILP1 |
| 0859 | F80A | 24900 | | LDI | #A |
| 085B | 73 | 24910 | | STXD | |
| 085C | 5E | 24920 | | STR | UTILP1 |
| 085D | F8E0 | 24930 | U99 | LDI | A.0/TIME |
| 085F | AF | 24940 | | PLO | RF |
| 0860 | C00BBB | 24950 | | LBR | JCD |
| 0863 | 8F | 24960 | ID | GLO | RF |
| 0864 | FAFC | 24970 | | ANI | #FC |
| 0866 | AF | 24980 | | PLO | RF |
| 0867 | 7E | 24990 | | SHLC | |
| 0868 | 7E | 25000 | | SHLC | |
| 0869 | 7E | 25010 | | SHLC | |
| 086A | 7E | 25020 | | SHLC | |
| 086B | FA07 | 25030 | | ANI | #7 |
| 086D | 5E | 25040 | | STR | UTILP1 |
| 086E | F80B | 25050 | | LDI | A.0/DISP,+6 |
| 0870 | AE | 25060 | | PLO | UTILP1 |
| 0871 | 8F | 25070 | | GLO | RF |
| 0872 | F6 | 25080 | | SHR | |
| 0873 | F6 | 25090 | | SHR | |
| 0874 | F6 | 25100 | | SHR | |
| 0875 | FA03 | 25110 | | ANI | #3 |
| 0877 | FC01 | 25120 | | ADI | #1 |
| 0879 | 5E | 25130 | | STR | UTILP1 |
| 087A | 1E | 25140 | | INC | UTILP1 |
| 087B | 8F | 25150 | | GLO | RF |
| 087C | F6 | 25160 | | SHR | |
| 087D | F6 | 25170 | | SHR | |
| 087E | FA01 | 25180 | | ANI | #1 |

| | | | | | |
|---|---|---|---|---|---|
| 0880 | FC0B | 25190 | | ADI | #B |
| 0882 | 5E | 25200 | | STR | UTILP1 |
| 0883 | 9F | 25210 | | GHI | RF |
| 0884 | FA40 | 25220 | | ANI | #40 |
| 0886 | CE | 25230 | | LSZ | |
| 0887 | F804 | 25240 | | LDI | #4 |
| 0889 | F4 | 25250 | | ADD | |
| 088A | 5E | 25260 | | STR | UTILP1 |
| 088B | F80C | 25270 | DCD | LDI | A.0/DISP,+7 |
| 088D | AE | 25280 | | PLO | UTILP1 |
| 088E | EE | 25290 | | SEX | UTILP1 |
| 088F | F80D | 25300 | | LDI | A.1/7SEG |
| 0891 | BA | 25310 | | PHI | UTILP2 |
| 0892 | F805 | 25320 | LOKUP | LDI | A.0/7SEG |
| 0894 | F4 | 25330 | | ADD | |
| 0895 | AA | 25340 | | PLO | UTILP2 |
| 0896 | 97 | 25350 | | GHI | FLAG |
| 0897 | FA02 | 25360 | | ANI | COLONBIT |
| 0899 | FF01 | 25370 | | SMI | #1 |
| 089B | 0A | 25380 | | LDN | UTILP2 |
| 089C | C7 | 25390 | | LSNF | |
| 089D | FAFD | 25400 | | ANI | COL |
| 089F | 73 | 25410 | | STXD | |
| 08A0 | 8E | 25420 | | GLO | UTILP1 |
| 08A1 | FD06 | 25430 | | SDI | A.0/DISP,+1 |
| 08A3 | CA0892 | 25440 | | LBNZ | LOKUP |
| 08A6 | 97 | 25450 | | GHI | FLAG |
| 08A7 | FAFD | 25460 | | ANI | NCOLONBIT |
| 08A9 | B7 | 25470 | | PHI | FLAG |
| 08AA | 2E | 25480 | | DEC | UTILP1 |
| 08AB | 0E | 25490 | | LDN | UTILP1 |
| 08AC | FCFA | 25500 | | ADI | A.0/DAYCHT |
| 08AE | AA | 25510 | | PLO | UTILP2 |
| 08AF | F800 | 25520 | | LDI | #0 |
| 08B1 | 7C0D | 25530 | | ADCI | A.1/DAYCHT |
| 08B3 | BA | 25540 | | PHI | UTILP2 |
| 08B4 | 0A | 25550 | | LDN | UTILP2 |
| 08B5 | 5E | 25560 | | STR | UTILP1 |
| 08B6 | D3 | 25570 | | SEP | PC |
| 08B7 | 7A | 25580 | MEASURE | REQ | |
| 08B8 | E2 | 25590 | | SEX | SP |
| 08B9 | F802 | 25600 | | LDI | A.0/TEMPIN |
| 08BB | AE | 25610 | | PLO | UTILP1 |
| 08BC | F8A0 | 25620 | | LDI | A.1/TEMPIN |
| 08BE | BE | 25630 | | PHI | UTILP1 |
| 08BF | F854 | 25640 | | LDI | A.0/A-D |
| 08C1 | A5 | 25650 | | PLO | SUBSUB |
| 08C2 | F80C | 25660 | | LDI | A.1/A-D |
| 08C4 | B5 | 25670 | | PHI | SUBSUB |
| 08C5 | F8F5 | 25680 | | LDI | ITMSK |
| 08C7 | D5 | 25690 | MEAS | SEP | SUBSUB |
| 08C8 | 02 | 25700 | | LDN | SP |
| 08C9 | A0 | 25710 | | PLO | TEMP |
| 08CA | 69 | 25720 | | INP | SWOPT |
| 08CB | FA20 | 25730 | | ANI | CEL |
| 08CD | FF01 | 25740 | | SMI | #1 |

| | | | | |
|---|---|---|---|---|
| 08CF | 80 | 25750 | GLO | TEMP |
| 08D0 | 3BEF | 25760 | BNF | FAHR |
| 08D2 | C5 | 25770 | LSNQ | |
| 08D3 | C4 | 25780 | NOP | |
| 08D4 | F6 | 25790 | SHR | |
| 08D5 | 52 | 25800 | STR | SF |
| 08D6 | F80F | 25810 | LDI | A.0/CEL.- |
| 08D8 | CD | 25820 | LSQ | |
| 08D9 | F822 | 25830 | LDI | A.0/CEL.+,-11 |
| 08DB | F4 | 25840 | ADD | |
| 08DC | AA | 25850 | PLO | UTILP2 |
| 08DD | F80E | 25860 | LDI | A.1/CEL.- |
| 08DF | CD | 25870 | LSQ | |
| 08E0 | F80E | 25880 | LDI | A.1/CEL.+,-11 |
| 08E2 | 7C00 | 25890 | ADCI | #0 |
| 08E4 | BA | 25900 | PHI | UTILP2 |
| 08E5 | 0A | 25910 | LDN | UTILP2 |
| 08E6 | 31F0 | 25920 | BQ | FAHR,+1 |
| 08E8 | EA | 25930 | SEX | UTILP2 |
| 08E9 | F6 | 25940 | SHR | |
| 08EA | F4 | 25950 | ADD | |
| 08EB | F6 | 25960 | SHR | |
| 08EC | FC30 | 25970 | ADI | #.48 |
| 08EE | 38 | 25980 | SKP | |
| 08EF | F6 | 25990 FAHR | SHR | |
| 08F0 | A0 | 26000 | PLO | TEMP |
| 08F1 | 12 | 26010 | INC | SF |
| 08F2 | C5 | 26020 | LSNQ | |
| 08F3 | 12 | 26030 | INC | SF |
| 08F4 | C4 | 26040 | NOP | |
| 08F5 | EE | 26050 | SEX | UTILP1 |
| 08F6 | 80 | 26060 | GLO | TEMP |
| 08F7 | F5 | 26070 | SD | |
| 08F8 | C20930 | 26080 | LBZ | T= |
| 08FB | C30912 | 26090 | LBNF | T> |
| 08FE | 02 | 26100 T< | LDN | SF |
| 08FF | FBF8 | 26110 | XRI | #F8 |
| 0901 | C2090B | 26120 | LBZ | USEIT |
| 0904 | 02 | 26130 | LDN | SF |
| 0905 | FF01 | 26140 | SMI | #1 |
| 0907 | 52 | 26150 | STR | SF |
| 0908 | C00933 | 26160 | LBR | TDONE |
| 090B | 02 | 26170 USEIT | LDN | SF |
| 090C | FC03 | 26180 | ADI | #3 |
| 090E | 52 | 26190 | STR | SF |
| 090F | C00923 | 26200 | LBR | SFLDIF |
| 0912 | 02 | 26210 T> | LDN | SF |
| 0913 | FB08 | 26220 | XRI | #8 |
| 0915 | C2091F | 26230 | LBZ | USEIT+ |
| 0918 | 02 | 26240 | LDN | SF |
| 0919 | FC01 | 26250 | ADI | #1 |
| 091B | 52 | 26260 | STR | SF |
| 091C | C00933 | 26270 | LBR | TDONE |
| 091F | 02 | 26280 USEIT+ | LDN | SF |
| 0920 | FF03 | 26290 | SMI | #3 |
| 0922 | 52 | 26300 | STR | SF |

| | | | | | |
|---|---|---|---|---|---|
| 0923 | 80 | 26310 | SPLDIF | GLO | TEMP |
| 0924 | F7 | 26320 | | SM | |
| 0925 | C7 | 26330 | | LSNF | |
| 0926 | FC01 | 26340 | | ADI | #1 |
| 0928 | B0 | 26350 | | PHI | TEMP |
| 0929 | FE | 26360 | | SHL | |
| 092A | 90 | 26370 | | GHI | TEMP |
| 092B | 76 | 26380 | | SHRC | |
| 092C | F4 | 26390 | | ADD | |
| 092D | 5E | 26400 | | STR | UTILP1 |
| 092E | 3033 | 26410 | | BR | TDONE |
| 0930 | F800 | 26420 | T= | LDI | #0 |
| 0932 | 52 | 26430 | | STR | SF |
| 0933 | 22 | 26440 | TDONE | DEC | SF |
| 0934 | C5 | 26450 | | LSNQ | |
| 0935 | 22 | 26460 | | DEC | SF |
| 0936 | C4 | 26470 | | NOP | |
| 0937 | E2 | 26480 | | SEX | SF |
| 0938 | C10942 | 26490 | | LBQ | TXIT |
| 093B | 1E | 26500 | | INC | UTILP1 |
| 093C | 7B | 26510 | | SEQ | |
| 093D | F8FF | 26520 | | LDI | OTMSK |
| 093F | C008C7 | 26530 | | LBR | MEAS |
| 0942 | 9B | 26540 | TXIT | GHI | SYNC |
| 0943 | FA80 | 26550 | | ANI | #80 |
| 0945 | C206F0 | 26560 | | LBZ | DISSTP,-1 |
| 0948 | 9B | 26570 | | GHI | SYNC |
| 0949 | FABF | 26580 | | ANI | #BF |
| 094B | BB | 26590 | | PHI | SYNC |
| 094C | D3 | 26600 | | SEP | PC |
| 094D | F803 | 26610 | | LDI | A.0/TEMPOUT |
| 094F | AE | 26620 | | PLO | UTILP1 |
| 0950 | F8A0 | 26630 | | LDI | A.1/TEMPOUT |
| 0952 | BE | 26640 | | PHI | UTILP1 |
| 0953 | F801 | 26650 | | LDI | A.0/NITDIF |
| 0955 | AA | 26660 | | PLO | UTILP2 |
| 0956 | F8A0 | 26670 | | LDI | A.1/NITDIF |
| 0958 | BA | 26680 | | PHI | UTILP2 |
| 0959 | 6C | 26690 | | INP | NITSW |
| 095A | A0 | 26700 | | PLO | TEMP |
| 095B | C20999 | 26710 | | LBZ | DIFSET |
| 095E | 69 | 26720 | | INP | SWOPT |
| 095F | FA20 | 26730 | | ANI | CEL |
| 0961 | C20973 | 26740 | | LBZ | NITF |
| 0964 | 80 | 26750 | | GLO | TEMP |
| 0965 | FA0F | 26760 | | ANI | #F |
| 0967 | FC64 | 26770 | | ADI | A.0/NITC |
| 0969 | A9 | 26780 | | PLO | MQ |
| 096A | F80F | 26790 | | LDI | A.1/NITC |
| 096C | 7C00 | 26800 | | ADCI | #0 |
| 096E | B9 | 26810 | | PHI | MQ |
| 096F | 09 | 26820 | | LDN | MQ |
| 0970 | C0098A | 26830 | | LBR | DIFCAL |
| 0973 | 80 | 26840 | NITF | GLO | TEMP |
| 0974 | FAF0 | 26850 | | ANI | #F0 |
| 0976 | F6 | 26860 | | SHR | |

| | | | | |
|---|---|---|---|---|
| 0977 | 52 | 26870 | STR | SP |
| 0978 | F6 | 26880 | SHR | |
| 0979 | F6 | 26890 | SHR | |
| 097A | F4 | 26900 | ADD | |
| 097B | 52 | 26910 | STR | SP |
| 097C | 80 | 26920 | GLO | TEMP |
| 097D | FA0F | 26930 | ANI | #F |
| 097F | F4 | 26940 | ADD | |
| 0980 | 52 | 26950 | STR | SP |
| 0981 | FF3C | 26960 | SMI | #.60 |
| 0983 | CF | 26970 | LSDF | |
| 0984 | 02 | 26980 | LDN | SP |
| 0985 | C8 | 26990 | LSKP | |
| 0986 | F83B | 27000 | LDI | #.59 |
| 0988 | FC1F | 27010 | ADI | #.31 |
| 098A | 52 | 27020 DIFCAL | STR | SP |
| 098B | 0E | 27030 | LDN | UTILP1 |
| 098C | F5 | 27040 | SD | |
| 098D | 3393 | 27050 | BDF | *,+6 |
| 098F | F800 | 27060 | LDI | #0 |
| 0991 | 3099 | 27070 | BR | DIFSET |
| 0993 | 3A99 | 27080 | BNZ | DIFSET |
| 0995 | 0A | 27090 | LDN | UTILP2 |
| 0996 | CE | 27100 | LSZ | |
| 0997 | F801 | 27110 | LDI | #1 |
| 0999 | 5A | 27120 DIFSET | STR | UTILP2 |
| 099A | 97 | 27130 | GHI | FLAG |
| 099B | FA40 | 27140 | ANI | HTOK |
| 099D | CE | 27150 | LSNZ | |
| 099E | 5A | 27160 | STR | UTILP2 |
| 099F | C4 | 27170 | NOP | |
| 09A0 | C909B9 | 27180 | LBNQ | WILT |
| 09A3 | 7A | 27190 | REQ | |
| 09A4 | 2A | 27200 | DEC | UTILP2 |
| 09A5 | 69 | 27210 | INP | SWOPT |
| 09A6 | FA30 | 27220 | ANI | CFL |
| 09A8 | 32B0 | 27230 | BZ | DAYF |
| 09AA | 6A | 27240 | INP | DAYSW |
| 09AB | FC31 | 27250 | ADI | #.49 |
| 09AD | C0098A | 27260 | LBR | DIFCAL |
| 09B0 | 6A | 27270 DAYF | INP | DAYSW |
| 09B1 | C6 | 27280 | LSNZ | |
| 09B2 | F8FB | 27290 | LDI | #.251 |
| 09B4 | FC51 | 27300 | ADI | #.81 |
| 09B6 | C0098A | 27310 | LBR | DIFCAL |
| 09B9 | F802 | 27320 WILT | LDI | A.0/TEMPIN |
| 09BB | AE | 27330 | PLO | UTILP1 |
| 09BC | F8A0 | 27340 | LDI | A.1/TEMPIN |
| 09BE | BE | 27350 | PHI | UTILP1 |
| 09BF | F854 | 27360 | LDI | A.0/A-D |
| 09C1 | A5 | 27370 | PLO | SUBSUB |
| 09C2 | F80C | 27380 | LDI | A.1/A-D |
| 09C4 | B5 | 27390 | PHI | SUBSUB |
| 09C5 | F8F6 | 27400 | LDI | ICMSK |
| 09C7 | D5 | 27410 | SEP | SUBSUB |
| 09C8 | 02 | 27420 | LDN | SP |

| | | | | |
|---|---|---|---|---|
| 09C9 | F6 | 27430 | SHR | |
| 09CA | C6 | 27440 | LSNZ | |
| 09CB | F801 | 27450 | LDI | #1 |
| 09CD | A0 | 27460 | PLO | TEMP |
| 09CE | F8F4 | 27470 | LDI | DIFCMSK |
| 09D0 | D5 | 27480 | SEP | SUBSUB |
| 09D1 | 02 | 27490 | LDN | SP |
| 09D2 | B0 | 27500 | PHI | TEMP |
| 09D3 | 69 | 27510 | INP | SWOPT |
| 09D4 | FA20 | 27520 | ANI | CEL |
| 09D6 | CA0A04 | 27530 | LBNZ | CELITE |
| 09D9 | 90 | 27540 | GHI | TEMP |
| 09DA | F6 | 27550 | SHR | |
| 09DB | F6 | 27560 | SHR | |
| 09DC | F6 | 27570 | SHR | |
| 09DD | FC03 | 27580 | ADI | #3 |
| 09DF | 52 | 27590 WLCAL | STR | SP |
| 09E0 | 87 | 27600 | GLO | FLAG |
| 09E1 | FA08 | 27610 | ANI | WLMSK |
| 09E3 | 3AF2 | 27620 | BNZ | ON |
| 09E5 | 80 | 27630 | GLO | TEMP |
| 09E6 | 52 | 27640 | STR | SP |
| 09E7 | 0E | 27650 | LDN | UTILP1 |
| 09E8 | F7 | 27660 | SM | |
| 09E9 | CB0A01 | 27670 | LBNF | DIFEX |
| 09EC | 87 | 27680 | GLO | FLAG |
| 09ED | F908 | 27690 | ORI | WLMSK |
| 09EF | C00A00 | 27700 | LBR | DIFEX,-1 |
| 09F2 | 80 | 27710 ON | GLO | TEMP |
| 09F3 | F7 | 27720 | SM | |
| 09F4 | CF | 27730 | LSDF | |
| 09F5 | F800 | 27740 | LDI | #0 |
| 09F7 | 52 | 27750 | STR | SP |
| 09F8 | 0E | 27760 | LDN | UTILP1 |
| 09F9 | F5 | 27770 | SD | |
| 09FA | CB0A01 | 27780 | LBNF | DIFEX |
| 09FD | 87 | 27790 | GLO | FLAG |
| 09FE | FAF7 | 27800 | ANI | NWLMSK |
| 0A00 | A7 | 27810 | PLO | FLAG |
| 0A01 | C00A32 | 27820 DIFEX | LBR | PUMP |
| 0A04 | 90 | 27830 CELITE | GHI | TEMP |
| 0A05 | F6 | 27840 | SHR | |
| 0A06 | F6 | 27850 | SHR | |
| 0A07 | F6 | 27860 | SHR | |
| 0A08 | B0 | 27870 | PHI | TEMP |
| 0A09 | 80 | 27880 | GLO | TEMP |
| 0A0A | 52 | 27890 | STR | SP |
| 0A0B | F6 | 27900 | SHR | |
| 0A0C | F4 | 27910 | ADD | |
| 0A0D | F6 | 27920 | SHR | |
| 0A0E | FC3D | 27930 | ADI | #,61 |
| 0A10 | A0 | 27940 | PLO | TEMP |
| 0A11 | FF55 | 27950 | SMI | #,85 |
| 0A13 | CB0A1C | 27960 | LBNF | SPACE |
| 0A16 | 90 | 27970 | GHI | TEMP |
| 0A17 | FC02 | 27980 | ADI | #2 |

| | | | | | |
|---|---|---|---|---|---|
| 0A19 | C009DF | 27990 | | LBR | WLCAL |
| 0A1C | 97 | 28000 | SPACE | GHI | FLAG |
| 0A1D | FA20 | 28010 | | ANI | LASTN |
| 0A1F | C20A2D | 28020 | | LBZ | DEG2 |
| 0A22 | 87 | 28030 | | GLO | FLAG |
| 0A23 | FA02 | 28040 | | ANI | DNFC |
| 0A25 | FB02 | 28050 | | XRI | DNFC |
| 0A27 | C20A2D | 28060 | | LBZ | DEG2 |
| 0A2A | 90 | 28070 | | GHI | TEMP |
| 0A2B | F6 | 28080 | | SHR | |
| 0A2C | F6 | 28090 | | SHR | |
| 0A2D | FC02 | 28100 | DEG2 | ADI | #2 |
| 0A2F | C009DF | 28110 | | LBR | WLCAL |
| 0A32 | 69 | 28120 | PUMP | INP | SWOPT |
| 0A33 | FA20 | 28130 | | ANI | CEL |
| 0A35 | C20A72 | 28140 | | LBZ | USPMP |
| 0A38 | 87 | 28150 | | GLO | FLAG |
| 0A39 | FA02 | 28160 | | ANI | DNFC |
| 0A3B | CA0A6C | 28170 | | LBNZ | PMPON |
| 0A3E | 97 | 28180 | | GHI | FLAG |
| 0A3F | FA20 | 28190 | | ANI | LASTN |
| 0A41 | C20A6C | 28200 | | LBZ | PMPON |
| 0A44 | 1E | 28210 | | INC | UTILP1 |
| 0A45 | 6C | 28220 | | INP | N1TSW |
| 0A46 | C6 | 28230 | | LSNZ | |
| 0A47 | FC01 | 28240 | | ADI | #1 |
| 0A49 | FC64 | 28250 | | ADI | A.0/NITC |
| 0A4B | AA | 28260 | | PLO | UTILP2 |
| 0A4C | F80F | 28270 | | LDI | A.1/NITC |
| 0A4E | 7C00 | 28280 | | ADCI | #0 |
| 0A50 | BA | 28290 | | PHI | UTILP2 |
| 0A51 | 0A | 28300 | | LDN | UTILP2 |
| 0A52 | FC03 | 28310 | | ADI | #3 |
| 0A54 | 52 | 28320 | | STR | SP |
| 0A55 | 0E | 28330 | | LDN | UTILP1 |
| 0A56 | F7 | 28340 | | SM | |
| 0A57 | 97 | 28350 | | GHI | FLAG |
| 0A58 | CF | 28360 | | LSNF | |
| 0A59 | FADF | 28370 | | ANI | NLASTN |
| 0A5B | B7 | 28380 | | PHI | FLAG |
| 0A5C | CB0A6C | 28390 | | LBNF | PMPON |
| 0A5F | 87 | 28400 | | GLO | FLAG |
| 0A60 | FA08 | 28410 | | ANI | WLMSK |
| 0A62 | CA0A69 | 28420 | | LBNZ | XIT |
| 0A65 | 97 | 28430 | PMPOFF | GHI | FLAG |
| 0A66 | FA7F | 28440 | | ANI | NPMPR |
| 0A68 | B7 | 28450 | | PHI | FLAG |
| 0A69 | C00A91 | 28460 | XIT | LBR | CHTLKP |
| 0A6C | 97 | 28470 | PMPON | GHI | FLAG |
| 0A6D | F980 | 28480 | | ORI | PMPR |
| 0A6F | C00A68 | 28490 | | LBR | XIT,-1 |
| 0A72 | F800 | 28500 | USPMP | LDI | A.0/DAYDIF |
| 0A74 | AE | 28510 | | PLO | UTILP1 |
| 0A75 | 87 | 28520 | | GLO | FLAG |
| 0A76 | FA02 | 28530 | | ANI | DNFC |
| 0A78 | C6 | 28540 | | LSNZ | |

| | | | | |
|---|---|---|---|---|
| 0A79 | 1E | 28550 | INC | UTILP1 |
| 0A7A | C4 | 28560 | NOP | |
| 0A7B | 0E | 28570 | LDN | UTILP1 |
| 0A7C | CA0A6C | 28580 | LBNZ | PMPON |
| 0A7F | F802 | 28590 | LDI | A.0/TEMPIN |
| 0A81 | AE | 28600 | PLO | UTILP1 |
| 0A82 | 80 | 28610 | GLO | TEMP |
| 0A83 | FF11 | 28620 | SMI | #.17 |
| 0A85 | CF | 28630 | LSDF | |
| 0A86 | F800 | 28640 | LDI | #0 |
| 0A88 | 52 | 28650 | STR | SP |
| 0A89 | 0E | 28660 | LDN | UTILP1 |
| 0A8A | F5 | 28670 | SD | |
| 0A8B | C30A65 | 28680 | LBDF | PMPOFF |
| 0A8E | C00A69 | 28690 | LBR | XIT |
| 0A91 | D3 | 30010 CHTLKP | SEP | PC |
| 0A92 | F818 | 30020 | LDI | A.0/STACK |
| 0A94 | A2 | 30030 | PLO | SP |
| 0A95 | F8A0 | 30040 | LDI | A.1/STACK |
| 0A97 | B2 | 30050 | PHI | SP |
| 0A98 | 98 | 30060 | GHI | CYCTMR |
| 0A99 | CA0AE2 | 30070 | LBNZ | CHT |
| 0A9C | F8A0 | 30080 | LDI | A.1/DAYDIF |
| 0A9E | BE | 30090 | PHI | UTILP1 |
| 0A9F | F800 | 30100 | LDI | A.0/DAYDIF |
| 0AA1 | AE | 30110 | PLO | UTILP1 |
| 0AA2 | 8C | 30120 | GLO | BSTMR |
| 0AA3 | C20AB1 | 30130 | LBZ | NOBST |
| 0AA6 | 0E | 30140 | LDN | UTILP1 |
| 0AA7 | CA0262 | 30150 | LBNZ | SUBSTART |
| 0AAA | F800 | 30160 | LDI | #0 |
| 0AAC | AC | 30170 | PLO | BSTMR |
| 0AAD | 87 | 30180 | GLO | FLAG |
| 0AAE | FAEF | 30190 | ANI | NBBMSK |
| 0AB0 | A7 | 30200 | PLO | FLAG |
| 0AB1 | 87 | 30210 NOBST | GLO | FLAG |
| 0AB2 | FA02 | 30220 | ANI | DNFC |
| 0AB4 | C6 | 30230 | LSNZ | |
| 0AB5 | 1E | 30240 | INC | UTILP1 |
| 0AB6 | C4 | 30250 | NOP | |
| 0AB7 | 0E | 30260 | LDN | UTILP1 |
| 0AB8 | CA0AC2 | 30270 | LBNZ | *,+10 |
| 0ABB | 87 | 30280 | GLO | FLAG |
| 0ABC | FAEF | 30290 | ANI | NBBMSK |
| 0ABE | A7 | 30300 | PLO | FLAG |
| 0ABF | C00262 | 30310 | LBR | SUBSTART |
| 0AC2 | 87 | 30320 | GLO | FLAG |
| 0AC3 | FA08 | 30330 | ANI | WLMSK |
| 0AC5 | CA0ACF | 30340 | LBNZ | *,+10 |
| 0AC8 | 87 | 30350 | GLO | FLAG |
| 0AC9 | F910 | 30360 | ORI | BBMSK |
| 0ACB | A7 | 30370 | PLO | FLAG |
| 0ACC | C00262 | 30380 | LBR | SUBSTART |
| 0ACF | 6E | 30390 | INP | SW |
| 0AD0 | FA04 | 30400 | ANI | WMSK |
| 0AD2 | C20ADB | 30410 | LBZ | *,+9 |

| | | | | | |
|---|---|---|---|---|---|
| 0AD5 | 87 | | 30420 | GLO | FLAG |
| 0AD6 | FA10 | | 30430 | ANI | RBMSK |
| 0AD8 | C20262 | | 30440 | LBZ | SUBSTART |
| 0ADB | F801 | | 30450 | LDI | #1 |
| 0ADD | BB | | 30460 | PHI | CYCTMR |
| 0ADE | 87 | | 30470 | GLO | FLAG |
| 0ADF | F910 | | 30480 | ORI | RBMSK |
| 0AE1 | A7 | | 30490 | PLO | FLAG |
| 0AE2 | F8A0 | | 30500 CHT | LDI | A.1/DAYDIF |
| 0AE4 | BE | | 30510 | PHI | UTILP1 |
| 0AE5 | F800 | | 30520 | LDI | A.0/DAYDIF |
| 0AE7 | AE | | 30530 | PLO | UTILP1 |
| 0AE8 | 87 | | 30540 | GLO | FLAG |
| 0AE9 | FA02 | | 30550 | ANI | DNFC |
| 0AEB | CA0B16 | | 30560 | LBNZ | DHT |
| 0AEE | 1E | | 30570 | INC | UTILP1 |
| 0AEF | F8E4 | | 30580 | LDI | A.0/DAY3 |
| 0AF1 | AA | | 30590 | PLO | UTILP2 |
| 0AF2 | F830 | | 30600 | LDI | A.1/DAY3 |
| 0AF4 | BA | | 30610 | PHI | UTILP2 |
| 0AF5 | 0A | | 30620 | LDN | UTILP2 |
| 0AF6 | F6 | | 30630 | SHR | |
| 0AF7 | 76 | | 30640 | SHRC | |
| 0AF8 | 76 | | 30650 | SHRC | |
| 0AF9 | 76 | | 30660 | SHRC | |
| 0AFA | F902 | | 30670 | ORI | #2 |
| 0AFC | AA | | 30680 | PLO | UTILP2 |
| 0AFD | F830 | | 30690 | LDI | A.1/RAM |
| 0AFF | BA | | 30700 | PHI | UTILP2 |
| 0B00 | 0A | | 30710 | LDN | UTILP2 |
| 0B01 | CA0B13 | | 30720 | LBNZ | NORMAL |
| 0B04 | 8A | | 30730 | GLO | UTILP2 |
| 0B05 | FC04 | | 30740 | ADI | #4 |
| 0B07 | AA | | 30750 | PLO | UTILP2 |
| 0B08 | FA1C | | 30760 | ANI | #1C |
| 0B0A | CA0B00 | | 30770 | LBNZ | *,-10 |
| 0B0D | F800 | | 30780 | LDI | #0 |
| 0B0F | 52 | | 30790 | STR | SP |
| 0B10 | C00B21 | | 30800 | LBR | ACURV |
| 0B13 | F8FC | | 30810 NORMAL | LDI | NHADJ |
| 0B15 | C8 | | 30820 | LSKP | |
| 0B16 | F8FD | | 30830 DHT | LDI | DHADJ |
| 0B18 | 52 | | 30840 | STR | SP |
| 0B19 | F854 | | 30850 | LDI | A.0/A-D |
| 0B1B | A5 | | 30860 | PLO | SUBSUB |
| 0B1C | F80C | | 30870 | LDI | A.1/A-D |
| 0B1E | B5 | | 30880 | PHI | SUBSUB |
| 0B1F | 02 | | 30890 | LDN | SP |
| 0B20 | D5 | | 30900 | SEP | SUBSUB |
| 0B21 | 0E | | 30910 ACURV | LDN | UTILP1 |
| 0B22 | FF02 | | 30920 | SMI | #2 |
| 0B24 | CB0BAE | | 30930 | LBNF | RB? |
| 0B27 | FC01 | | 30940 | ADI | #1 |
| 0B29 | A9 | | 30950 | PLO | MQ |
| 0B2A | 02 | | 30960 | LDN | SP |
| 0B2B | F6 | | 30970 | SHR | |

| | | | | |
|---|---|---|---|---|
| 32C | F6 | 30980 | SHR | |
| 32D | F6 | 30990 | SHR | |
| 32E | F6 | 31000 | SHR | |
| 32F | FC17 | 31010 | ADI | A.0/TABLE |
| 331 | AE | 31020 | PLO | UTILP1 |
| 332 | F80D | 31030 | LDI | A.1/TABLE |
| 334 | BE | 31040 | PHI | UTILP1 |
| 335 | 0E | 31050 | LDN | UTILP1 |
| 336 | FC27 | 31060 | ADI | A.0/CHART |
| 338 | AA | 31070 | PLO | UTILP2 |
| 339 | F80D | 31080 | LDI | A.1/CHART |
| 33B | 7C00 | 31090 | ADCI | #0 |
| 33D | BA | 31100 | PHI | UTILP2 |
| 33E | 69 | 31110 | INP | SWOPT |
| 33F | FA20 | 31120 | ANI | CEL |
| 341 | C2 0B4F | 31130 | LBZ | FCHT |
| 344 | 89 | 31140 | GLO | MQ |
| 345 | FC2D | 31150 | ADI | A.0/C-F |
| 347 | A9 | 31160 | PLO | MQ |
| 348 | F800 | 31170 | LDI | #0 |
| 34A | 7C0F | 31180 | ADCI | A.1/C-F |
| 34C | B9 | 31190 | PHI | MQ |
| 34D | 09 | 31200 | LDN | MQ |
| 34E | A9 | 31210 | PLO | MQ |
| 34F | EA | 31220 FCHT | SEX | UTILP2 |
| 350 | 89 | 31230 | GLO | MQ |
| 351 | F7 | 31240 | SM | |
| 352 | 3B58 | 31250 | BNF | *,+6 |
| 354 | 60 | 31260 | IRX | |
| 355 | 60 | 31270 | IRX | |
| 356 | 3050 | 31280 | BR | *,-6 |
| 358 | E2 | 31290 | SEX | SP |
| 359 | 1A | 31300 | INC | UTILP2 |
| 35A | 0A | 31310 | LDN | UTILP2 |
| 35B | F6 | 31320 | SHR | |
| 35C | F6 | 31330 | SHR | |
| 35D | F6 | 31340 | SHR | |
| 35E | F6 | 31350 | SHR | |
| 35F | F6 | 31360 | SHR | |
| 360 | FC01 | 31370 | ADI | #1 |
| 362 | 52 | 31380 | STR | SP |
| 363 | F86F | 31390 | LDI | A.0/MULT |
| 365 | A5 | 31400 | PLO | SUBSUB |
| 366 | F80C | 31410 | LDI | A.1/MULT |
| 368 | B5 | 31420 | PHI | SUBSUB |
| 369 | D5 | 31430 | SEP | SUBSUB |
| 36A | 99 | 31440 | GHI | MQ |
| 36B | B0 | 31450 | PHI | TEMP |
| 36C | D3 | 31460 | SEP | PC |
| 36D | E2 | 31470 | SEX | SP |
| 36E | F86F | 31480 | LDI | A.0/MULT |
| 370 | A5 | 31490 | PLO | SUBSUB |
| 371 | F80C | 31500 | LDI | A.1/MULT |
| 373 | B5 | 31510 | PHI | SUBSUB |
| 374 | F834 | 31520 | LDI | #34 |
| 376 | 52 | 31530 | STR | SP |

| | | | | | |
|---|---|---|---|---|---|
| 0B77 | D5 | | 31540 | SEP | SUBSUB |
| 0B78 | 99 | | 31550 | GHI | MQ |
| 0B79 | A0 | | 31560 | PLO | TEMP |
| 0B7A | 90 | | 31570 | GHI | TEMP |
| 0B7B | A9 | | 31580 | PLO | MQ |
| 0B7C | D5 | | 31590 | SEP | SUBSUB |
| 0B7D | 80 | | 31600 | GLO | TEMP |
| 0B7E | 52 | | 31610 | STR | SP |
| 0B7F | 89 | | 31620 | GLO | MQ |
| 0B80 | F4 | | 31630 | ADD | |
| 0B81 | A9 | | 31640 | PLO | MQ |
| 0B82 | 0A | | 31650 | LDN | UTILP2 |
| 0B83 | FA1F | | 31660 | ANI | #1F |
| 0B85 | 52 | | 31670 | STR | SP |
| 0B86 | 89 | | 31680 | GLO | MQ |
| 0B87 | F4 | | 31690 | ADD | |
| 0B88 | FF15 | | 31700 | SMI | #.21 |
| 0B8A | CB0BAE | | 31710 | LBNF | BB? |
| 0B8D | A9 | | 31720 | PLO | MQ |
| 0B8E | 6E | | 31730 | INP | SW |
| 0B8F | FA03 | | 31740 | ANI | #3 |
| 0B91 | FC0A | | 31750 | ADI | A.0/NORMCHT |
| 0B93 | AE | | 31760 | PLO | UTILP1 |
| 0B94 | F800 | | 31770 | LDI | #0 |
| 0B96 | 7C0E | | 31780 | ADCI | A.1/NORMCHT |
| 0B98 | BE | | 31790 | PHI | UTILP1 |
| 0B99 | 69 | | 31800 | INP | SWOPT |
| 0B9A | FA40 | | 31810 | ANI | TENMIN |
| 0B9C | CE | | 31820 | LSZ | |
| 0B9D | 1E | | 31830 | INC | UTILP1 |
| 0B9E | C4 | | 31840 | NOP | |
| 0B9F | 0E | | 31850 | LDN | UTILP1 |
| 0BA0 | 52 | | 31860 | STR | SP |
| 0BA1 | D5 | | 31870 | SEP | SUBSUB |
| 0BA2 | 89 | | 31880 | GLO | MQ |
| 0BA3 | FE | | 31890 | SHL | |
| 0BA4 | 99 | | 31900 | GHI | MQ |
| 0BA5 | 7E | | 31910 | SHLC | |
| 0BA6 | FC01 | | 31920 | DET | ADI | #1 |
| 0BA8 | 52 | | 31930 | STR | SP |
| 0BA9 | 98 | | 31940 | GHI | CYCTMR |
| 0BAA | F7 | | 31950 | SM | |
| 0BAB | CB0BC3 | | 31960 | LBNF | HTEX |
| 0BAE | 87 | | 31970 | BB? | GLO | FLAG |
| 0BAF | FA10 | | 31980 | ANI | BBMSK |
| 0BB1 | C20BC3 | | 31990 | LBZ | HDEX |
| 0BB4 | F800 | | 32000 | LDI | A.0/DAYDIF |
| 0BB6 | AE | | 32010 | PLO | UTILP1 |
| 0BB7 | F8A0 | | 32020 | LDI | A.1/DAYDIF |
| 0BB9 | BE | | 32030 | PHI | UTILP1 |
| 0BBA | F800 | | 32040 | LDI | #0 |
| 0BBC | 5E | | 32050 | STR | UTILP1 |
| 0BBD | 1E | | 32060 | INC | UTILP1 |
| 0BBE | 5E | | 32070 | STR | UTILP1 |
| 0BBF | 87 | | 32080 | GLO | FLAG |
| 0BC0 | FAEF | | 32090 | ANI | NBBMSK |

| | | | | | |
|---|---|---|---|---|---|
| 0BC2 | A7 | 32100 | | PLO | FLAG |
| 0BC3 | D3 | 32110 | HTEX | SEP | PC |
| 0BC4 | C00262 | 32120 | | LBR | SUBSTART |
| 0BC7 | C0004B | 32130 | RTURN2 | LBR | RESTRT |
| 0BCA | E1 | 32140 | PWUN | SEX | INT |
| 0BCB | 62 | 32150 | | OUT | SEGPT |
| 0BCC | FF | 32160 | | DT | &HFF |
| 0BCD | 63 | 32170 | | OUT | DIGPT |
| 0BCE | FF | 32180 | | DT | &HFF |
| 0BCF | 66 | 32190 | | OUT | CONTR |
| 0BD0 | FF | 32200 | | DT | &HFF |
| 0BD1 | F850 | 32210 | | LDI | #.80 |
| 0BD3 | FF01 | 32220 | | SMI | #1 |
| 0BD5 | 3DC7 | 32230 | | BN2 | RTURN2 |
| 0BD7 | 3AD3 | 32240 | | BNZ | *,-4 |
| 0BD9 | F899 | 32250 | | LDI | A.0/DATA |
| 0BDB | AE | 32260 | | PLO | UTILP1 |
| 0BDC | F80D | 32270 | | LDI | A.1/DATA |
| 0BDE | BE | 32280 | | PHI | UTILP1 |
| 0BDF | F8A0 | 32290 | | LDI | A.1/CRAM |
| 0BE1 | B4 | 32300 | | PHI | SUB |
| 0BE2 | F819 | 32310 | | LDI | A.0/CRAM,+&H19 |
| 0BE4 | A4 | 32320 | | PLO | SUB |
| 0BE5 | E4 | 32330 | | SEX | SUB |
| 0BE6 | 4E | 32340 | | LDA | UTILP1 |
| 0BE7 | 73 | 32350 | | STXD | |
| 0BE8 | 84 | 32360 | | GLO | SUB |
| 0BE9 | CA0BE6 | 32370 | | LBNZ | *,-3 |
| 0BEC | 4E | 32380 | | LDA | UTILP1 |
| 0BED | 54 | 32390 | | STR | SUB |
| 0BEE | F800 | 32400 | | LDI | #0 |
| 0BF0 | A9 | 32410 | | PLO | MQ |
| 0BF1 | B9 | 32420 | | PHI | MQ |
| 0BF2 | 9D | 32430 | | GHI | HZCNTR |
| 0BF3 | AE | 32440 | | PLO | UTILP1 |
| 0BF4 | 3DC7 | 32450 | | BN2 | RTURN2 |
| 0BF6 | D4 | 32460 | | SEP | SUB |
| 0BF7 | 8E | 32470 | | GLO | UTILP1 |
| 0BF8 | BD | 32480 | | PHI | HZCNTR |
| 0BF9 | F800 | 32490 | | LDI | A.0/RDAY |
| 0BFB | A4 | 32500 | | PLO | SUB |
| 0BFC | F80C | 32510 | | LDI | A.1/RDAY |
| 0BFE | B4 | 32520 | | PHI | SUB |
| 0BFF | D4 | 32530 | | SEP | SUB |
| 0C00 | 89 | 32540 | RDAY | GLO | MQ |
| 0C01 | FFA0 | 32550 | | SMI | #.160 |
| 0C03 | A9 | 32560 | | PLO | MQ |
| 0C04 | 99 | 32570 | | GHI | MQ |
| 0C05 | 7F05 | 32580 | | SMBI | #5 |
| 0C07 | CB0C1B | 32590 | | LBNF | RHR |
| 0C0A | B9 | 32600 | | PHI | MQ |
| 0C0B | F8EC | 32610 | | LDI | A.0/INCDAY |
| 0C0D | A5 | 32620 | | PLO | SUBSUB |
| 0C0E | F80D | 32630 | | LDI | A.1/INCDAY |
| 0C10 | B5 | 32640 | | PHI | SUBSUB |
| 0C11 | D5 | 32650 | | SEP | SUBSUB |

| | | | | | |
|---|---|---|---|---|---|
| 0C12 | C00C00 | 32660 | | LBR | RDAY |
| 0C15 | C0004B | 32670 | RTURN | LBR | RESTRT |
| 0C18 | F8E0 | 32680 | RHR | LDI | A.0/TIME |
| 0C1A | AE | 32690 | | PLO | UTILP1 |
| 0C1B | F830 | 32700 | | LDI | A.1/TIME |
| 0C1D | BE | 32710 | | PHI | UTILP1 |
| 0C1E | 89 | 32720 | | GLO | MQ |
| 0C1F | FCA0 | 32730 | | ADI | #.160 |
| 0C21 | A9 | 32740 | | PLO | MQ |
| 0C22 | 89 | 32750 | | GLO | MQ |
| 0C23 | FF3C | 32760 | | SMI | #.60 |
| 0C25 | A9 | 32770 | | PLO | MQ |
| 0C26 | 99 | 32780 | | GHI | MQ |
| 0C27 | 7F00 | 32790 | | SMBI | #0 |
| 0C29 | CB0C3A | 32800 | | LBNF | RMIN |
| 0C2C | B9 | 32810 | | PHI | MQ |
| 0C2D | F8CA | 32820 | | LDI | A.0/INCHRS |
| 0C2F | A5 | 32830 | | PLO | SUBSUB |
| 0C30 | F80D | 32840 | | LDI | A.1/INCHRS |
| 0C32 | B5 | 32850 | | PHI | SUBSUB |
| 0C33 | D5 | 32860 | | SEP | SUBSUB |
| 0C34 | C7 | 32870 | | LSNF | |
| 0C35 | C4 | 32880 | | NOP | |
| 0C36 | D5 | 32890 | | SEP | SUBSUB |
| 0C37 | C00C22 | 32900 | | LBR | RHR,+10 |
| 0C3A | 89 | 32910 | RMIN | GLO | MQ |
| 0C3B | FC3C | 32920 | | ADI | #.60 |
| 0C3D | A9 | 32930 | | PLO | MQ |
| 0C3E | 89 | 32940 | | GLO | MQ |
| 0C3F | C2004B | 32950 | | LBZ | RESTRT |
| 0C42 | 29 | 32960 | | DEC | MQ |
| 0C43 | F8B3 | 32970 | | LDI | A.0/INCMIN |
| 0C45 | A5 | 32980 | | PLO | SUBSUB |
| 0C46 | F80D | 32990 | | LDI | A.1/INCMIN |
| 0C48 | B5 | 33000 | | PHI | SUBSUB |
| 0C49 | D5 | 33010 | | SEP | SUBSUB |
| 0C4A | C7 | 33020 | | LSNF | |
| 0C4B | C4 | 33030 | | NOP | |
| 0C4C | D5 | 33040 | | SEP | SUBSUB |
| 0C4D | C7 | 33050 | | LSNF | |
| 0C4E | C4 | 33060 | | NOP | |
| 0C4F | D5 | 33070 | | SEP | SUBSUB |
| 0C50 | C00C3E | 33080 | | LBR | RMIN,+4 |
| 0C53 | D4 | 33090 | | SEP | SUB |
| 0C54 | E2 | 33100 | A-D | SEX | SP |
| 0C55 | 52 | 33110 | | STR | SP |
| 0C56 | 64 | 33120 | | OUT | ANASW |
| 0C57 | 22 | 33130 | | DEC | SP |
| 0C58 | F8FF | 33140 | | LDI | #FF |
| 0C5A | 52 | 33150 | | STR | SP |
| 0C5B | F880 | 33160 | | LDI | #80 |
| 0C5D | AB | 33170 | | PLO | UTIL |
| 0C5E | F5 | 33180 | | SD | |
| 0C5F | 52 | 33190 | | STR | SP |
| 0C60 | 65 | 33200 | | OUT | LADDER |
| 0C61 | 22 | 33210 | | DEC | SP |

| | | | | |
|---|---|---|---|---|
| 0C62 | 3E67 | 33220 | BNS | *,+5 |
| 0C64 | 8B | 33230 | GLO | UTIL |
| 0C65 | F4 | 33240 | ADD | |
| 0C66 | 52 | 33250 | STR | SP |
| 0C67 | 8B | 33260 | GLO | UTIL |
| 0C68 | F6 | 33270 | SHR | |
| 0C69 | 3B5D | 33280 | BNF | *,-12 |
| 0C6B | C00C53 | 33290 | LBR | A-D,-1 |
| 0C6E | D4 | 33300 FIN | SEP | SUB |
| 0C6F | F800 | 33310 MULT | LDI | #0 |
| 0C71 | B9 | 33320 | PHI | MQ |
| 0C72 | F6 | 33330 | SHR | |
| 0C73 | F809 | 33340 | LDI | #9 |
| 0C75 | AB | 33350 | PLO | UTIL |
| 0C76 | E2 | 33360 | SEX | SP |
| 0C77 | 2B | 33370 MLP | DEC | UTIL |
| 0C78 | 99 | 33380 | GHI | MQ |
| 0C79 | 76 | 33390 | SHRC | |
| 0C7A | B9 | 33400 | PHI | MQ |
| 0C7B | 89 | 33410 | GLO | MQ |
| 0C7C | 76 | 33420 | SHRC | |
| 0C7D | A9 | 33430 | PLO | MQ |
| 0C7E | 8B | 33440 | GLO | UTIL |
| 0C7F | C20C6E | 33450 | LBZ | FIN |
| 0C82 | 99 | 33460 | GHI | MQ |
| 0C83 | C7 | 33470 | LSNF | |
| 0C84 | F4 | 33480 | ADD | |
| 0C85 | B9 | 33490 | PHI | MQ |
| 0C86 | C00C77 | 33500 | LBR | MLP |
| 0C89 | D4 | 33510 DIVFIN | SEP | SUB |
| 0C8A | E2 | 33520 DIV | SEX | SP |
| 0C8B | F809 | 33530 | LDI | #9 |
| 0C8D | AB | 33540 | PLO | UTIL |
| 0C8E | FE | 33550 | SHL | |
| 0C8F | 2B | 33560 DLP | DEC | UTIL |
| 0C90 | 99 | 33570 | GHI | MQ |
| 0C91 | 3B96 | 33580 | BNF | *,+5 |
| 0C93 | F7 | 33590 | SM | |
| 0C94 | 3099 | 33600 | BR | *,+5 |
| 0C96 | F7 | 33610 | SM | |
| 0C97 | 3B9D | 33620 | BNF | *,+6 |
| 0C99 | B9 | 33630 | PHI | MQ |
| 0C9A | F801 | 33640 | LDI | #1 |
| 0C9C | F6 | 33650 | SHR | |
| 0C9D | 89 | 33660 | GLO | MQ |
| 0C9E | 7E | 33670 | SHLC | |
| 0C9F | A9 | 33680 | PLO | MQ |
| 0CA0 | 99 | 33690 | GHI | MQ |
| 0CA1 | 7E | 33700 | SHLC | |
| 0CA2 | B9 | 33710 | PHI | MQ |
| 0CA3 | 8B | 33720 | GLO | UTIL |
| 0CA4 | 3A8F | 33730 | BNZ | DLP |
| 0CA6 | 3089 | 33740 | BR | DIVFIN |
| 0CA8 | 8F | 33750 SUB4 | GLO | RF |

| | | | | | |
|---|---|---|---|---|---|
| 0CA9 | FFE0 | 33760 | | SMI | A.0/TIME |
| 0CAB | CA0CF6 | 33770 | | LBNZ | EX5 |
| 0CAE | 22 | 33780 | | DEC | SP |
| 0CAF | 6E | 33790 | | INP | SW |
| 0CB0 | FA03 | 33800 | | ANI | #3 |
| 0CB2 | FC00 | 33810 | | ADI | A.0/TIML.MT |
| 0CB4 | AE | 33820 | | PLO | UTILP1 |
| 0CB5 | F80D | 33830 | | LDI | A.1/TIML.MT |
| 0CB7 | BE | 33840 | | PHI | UTILP1 |
| 0CB8 | 69 | 33850 | | INP | SWOPT |
| 0CB9 | FA40 | 33860 | | ANI | TENMIN |
| 0CBB | CE | 33870 | | LSZ | |
| 0CBC | 1E | 33880 | | INC | UTILP1 |
| 0CBD | C4 | 33890 | | NOP | |
| 0CBE | 12 | 33900 | | INC | SP |
| 0CBF | 98 | 33910 | | GHI | CYCTMR |
| 0CC0 | C20CD2 | 33920 | | LBZ | RSTDEC |
| 0CC3 | F4 | 33930 | | ADD | |
| 0CC4 | C30CCE | 33940 | | LBDF | *,+10 |
| 0CC7 | B8 | 33950 | | PHI | CYCTMR |
| 0CC8 | EE | 33960 | | SEX | UTILP1 |
| 0CC9 | F5 | 33970 | | SD | |
| 0CCA | E2 | 33980 | | SEX | SP |
| 0CCB | C30CD2 | 33990 | | LBDF | RSTDEC |
| 0CCE | F800 | 34000 | | LDI | #0 |
| 0CD0 | B8 | 34010 | | PHI | CYCTMR |
| 0CD1 | A8 | 34020 | | PLO | CYCTMR |
| 0CD2 | 8C | 34030 | RSTDEC | GLO | BSTMR |
| 0CD3 | C20CEA | 34040 | | LBZ | H1.5DEC |
| 0CD6 | F800 | 34050 | | LDI | #0 |
| 0CD8 | A8 | 34060 | | PLO | CYCTMR |
| 0CD9 | B8 | 34070 | | PHI | CYCTMR |
| 0CDA | 8C | 34080 | | GLO | BSTMR |
| 0CDB | F7 | 34090 | | SM | |
| 0CDC | CF | 34100 | | LSDF | |
| 0CDD | F800 | 34110 | | LDI | #0 |
| 0CDF | AC | 34120 | | PLO | BSTMR |
| 0CE0 | 3AEA | 34130 | | BNZ | H1.5DEC |
| 0CE2 | 87 | 34140 | | GLO | FLAG |
| 0CE3 | FA08 | 34150 | | ANI | WLMSK |
| 0CE5 | 32EA | 34160 | | BZ | H1.5DEC |
| 0CE7 | F801 | 34170 | | LDI | #1 |
| 0CE9 | B8 | 34180 | | PHI | CYCTMR |
| 0CEA | 9C | 34190 | H1.5DEC | GHI | H1.5H |
| 0CEB | 32F2 | 34200 | | BZ | EX4 |
| 0CED | F7 | 34210 | | SM | |
| 0CEE | CF | 34220 | | LSDF | |
| 0CEF | F800 | 34230 | | LDI | #0 |
| 0CF1 | BC | 34240 | | PHI | H1.5H |
| 0CF2 | 97 | 34250 | EX4 | GHI | FLAG |
| 0CF3 | F904 | 34260 | | ORI | COINBIT |
| 0CF5 | B7 | 34270 | | PHI | FLAG |
| 0CF6 | 12 | 34280 | EX5 | INC | SP |

```
                                                H1A,&HA,&HD3,&H2,&H12
OD0F    FF07BF2AC22F0FAA                34330
                                        DT      &HFF,&H7,&HBF,&H2A,&HC2,&H
                                                2F,&HF,&HAA
OD17    00060C1218IC242A343E464C565E646C 34340
                                        DT      0,6,12,18,24,28,36,42,52,6
                                                2,70,76,86,94,100,108
                                        TABLE
OD27    19122D2DFF44                    34350
                                        CHART   DT      25,18,45,45,255,68
OD2D    1413282FFF47                    34360
                                        DT      20,19,40,47,255,71
OD33    14143C4CFF60                    34370
                                        DT      20,20,60,76,255,96
OD39    0F321E4FFF69                    34380
                                        DT      15,50,30,79,255,105
OD3F    0F15FF6C                        34390
                                        DT      15,21,255,108
OD43    0A150F331E6DFF87                34400
                                        DT      10,21,15,51,30,109,255,135
OD4B    0A161452FF8A                    34410
                                        DT      10,22,20,82,255,138
OD51    0A170F531470328CFFA2            34420
                                        DT      10,23,15,83,20,112,50,140,
                                                255,162
OD5B    0A370F551472238EFFA7            34430
                                        DT      10,55,15,85,20,114,35,142,
                                                255,167
OD65    0A390F751E92FFAC                34440
                                        DT      10,57,15,117,30,146,255,17
                                                2
OD6D    0A3B1E95FFAF                    34450
                                        DT      10,59,30,149,255,175
OD73    055C0A7B0F991EB6FFD0            34460
                                        DT      5,92,10,123,15,153,30,182,
                                                255,208
OD7D    057C0A9B0FB9FFD6                34470
                                        DT      5,124,10,155,15,185,255,21
                                                4
OD85    057D0A9CFFD8                    34480
                                        DT      5,125,10,156,255,216
OD8B    057E0ABC19DAFFF5                34490
                                        DT      5,126,10,188,25,218,255,24
                                                5
OD93    0A9F14DDFFF9                    34500
                                        DT      10,159,20,221,255,249
OD99    003019AEC4F8003ABE1ED1          34510
                                        DATA
                                        DT      0,&H30,&H19,&HAE,&HC4,&HFB
                                                ,&H0,&H3A,&H8E,&H1E,&HD1
ODA4    1035063A7B9A2A7AC4AA            34520
                                        DT      &H10,&H35,&H6,&H3A,&H7B,&H
                                                9A,&H2A,&H7A,&HC4,&HAA
ODAE    C4F8BA4FF8                      34530
                                        DT      &HC4,&HF8,&HBA,&H4F,&HF8
ODB3    0E                      34540   INCMIN  LDN     UTILP1
ODB4    FF09                    34550           SMI     #9
ODB6    33BC                    34560           BDF     *,+6
ODB8    FC0A                    34570           ADI     #A
ODBA    FE                      34580           SHL
ODBB    76                      34590           SHRC
ODBC    5E                      34600           STR     UTILP1
ODBD    1E                      34610           INC     UTILP1
ODBE    0E                      34620           LDN     UTILP1
ODBF    7F05                    34630           SMBI    #5
ODC1    33C7                    34640           BDF     *,+6
ODC3    FC06                    34650           ADI     #6
ODC5    FE                      34660           SHL
ODC6    76                      34670           SHRC
ODC7    5E                      34680           STR     UTILP1
ODC8    2E                      34690           DEC     UTILP1
```

| | | | | | |
|---|---|---|---|---|---|
| 0DC9 | D4 | | 34700 | SEP | SUB |
| 0DCA | 1E | | 34710 INCHRS | INC | UTILP1 |
| 0DCB | 1E | | 34720 | INC | UTILP1 |
| 0DCC | 0E | | 34730 | LDN | UTILP1 |
| 0DCD | FF0C | | 34740 | SMI | #C |
| 0DCF | CF | | 34750 | LSDF | |
| 0DD0 | FC0C | | 34760 | ADI | #C |
| 0DD2 | FF0B | | 34770 | SMI | #B |
| 0DD4 | 3BDC | | 34780 | BNF | *,+8 |
| 0DD6 | FF00 | | 34790 | SMI | #0 |
| 0DD8 | F80C | | 34800 | LDI | #C |
| 0DDA | 30E0 | | 34810 | BR | *,+6 |
| 0DDC | FC0C | | 34820 | ADI | #C |
| 0DDE | FE | | 34830 | SHL | |
| 0DDF | 76 | | 34840 | SHRC | |
| 0DE0 | 5F | | 34850 | STR | UTILP1 |
| 0DE1 | 1E | | 34860 | INC | UTILP1 |
| 0DE2 | 0E | | 34870 | LDN | UTILP1 |
| 0DE3 | 7CFE | | 34880 | ADCI | #FE |
| 0DE5 | FA01 | | 34890 | ANI | #1 |
| 0DE7 | 5F | | 34900 | STR | UTILP1 |
| 0DE8 | 2E | | 34910 | DEC | UTILP1 |
| 0DE9 | 2E | | 34920 | DEC | UTILP1 |
| 0DEA | 2E | | 34930 | DEC | UTILP1 |
| 0DEB | D4 | | 34940 | SEP | SUB |
| 0DEC | F8E4 | | 34950 INCDAY | LDI | A.0/DAY3 |
| 0DEE | AA | | 34960 | PLO | UTILP2 |
| 0DEF | F830 | | 34970 | LDI | A.1/DAY3 |
| 0DF1 | BA | | 34980 | PHI | UTILP2 |
| 0DF2 | 0A | | 34990 | LDN | UTILP2 |
| 0DF3 | FF06 | | 35000 | SMI | #6 |
| 0DF5 | CF | | 35010 | LSDF | |
| 0DF6 | FC07 | | 35020 | ADI | #7 |
| 0DF8 | 5A | | 35030 | STR | UTILP2 |
| 0DF9 | D4 | | 35040 DAYFIN | SEP | SUB |
| 0DFA | FBFEBFF7EF7FDFFF | | 35050 | | |
| | | | DAYCHT | DT | &HFB,&HFE,&HBF,&HF7,&HEF,&H7F,&HDF,&HFF |
| 0E02 | FDFBF7BFFEEF7FDF | | 35060 | | |
| | | | SCANCHT | DT | &HFD,&HFB,&HF7,&HBF,&HFE,&H |
| 0E0A | 162C4080C0 | | 35070 | | |
| | | | NORMCHT | DT | 22,44,64,128,192 |
| 0E0F | 060607070808090908080808080C0C0D0D0E0E0F10101111121213131414151516 | | | | |
| | | 35080 | | | |
| | | | CEL- | DT | 6,6,7,7,8,8,9,9,10,11,11,12,12,13,13,14,14,15,16,16,17,17,18,18,19,19,20,21,21,22 |
| 0E2D | 161717181819191A1A1B1B1C1C1D1D1E1F1F | | | 35090 | |
| | | | CEL+ | DT | 22,23,23,24,24,25,26,26,27,27,28,28,29,29,30,31,31 |
| 0E3E | 202021212222232424252526262727282929 | | | 35100 | |
| | | | | DT | 32,32,33,33,34,34,35,36,36,37,37,38,38,39,39,40,41,41 |
| 0E50 | 2A2A2B2B2C2C2D2E2E2F2F30303131323333 | | | 35110 | |
| | | | | DT | 42,42,43,43,44,44,45,46,46,47,47,48,48,49,49,50,51,51 |
| 0E62 | 343435353636373838393A3A3B3B3C3D3D | | | 35120 | |
| | | | | DT | 52,52,53,53,54,54,55,56,56,57,57,58,58,59,59,60,61,61 |
| 0E74 | 3E3E3F3F40404142424344444545464747 | | | 35130 | |
| | | | | DT | 62,62,63,63,64,64,65,66,66,67,67,68,68,69,69,70,71,71 |
| 0E86 | 484849494A4A4B4C4C4D4D4E4E4F4F505151 | | | 35140 | |
| | | | | DT | 72,72,73,73,74,74,75,76,76,77,77,78,78,79,79,80,81,81 |
| 0E98 | 525253535454555656575758585959595A5B5B | | | 35150 | |
| | | | | DT | 82,82,83,83,84,84,85,86,86,87,87,88,88,89,89,90,91,91 |
| 0EAA | 5C5C5D5D5E5E5F6060616162626363646565 | | | 35160 | |
| | | | | DT | 92,92,93,93,94,94,95,96,96 |

```
        ,97,97,98,98,99,99,100,101,101                                35170
OFBC    666667676868696A6A6A6A6A6C6C6D6D6E6F6F               102,102,103,103,104,104,10
                                           DT
        5,106,106,107,107,108,108,109,109,110,111,111                 35180
OECE    7070717172727374747575767677777787979                112,112,113,113,114,114,11
                                           DT
        5,116,116,117,117,118,118,119,119,120,121,121                 35190
OEEO    7A7A7B7B7C7C7D7E7E7F7F80808181828383                 122,122,123,123,124,124,12
                                           DT
        5,126,126,127,127,128,128,129,129,130,131,131                 35200
OEF2    8484858586868788888989898A8A8B8B8C8D8D               132,132,133,133,134,134,13
                                           DT
        5,136,136,137,137,138,138,139,139,140,141,141                 35210
OF04    8E8E8F8F90909192929393949495959697 97                142,142,143,143,144,144,14
                                           DT
        5,146,146,147,147,148,148,149,149,150,151,151                 35220
OF16    989899999A9A9B9C9C9D9D9E9E9F9FA0                     152,152,153,153,154,154,15
                                           DT
        5,156,156,157,157,158,158,159,159,160
OF26    A1A1A2A2A3A3A4                         35230
                                           DT    161,161,162,162,163,163,14
4
OF2D    0002040507090B0D0E10121416171919181D                          35240
                                 C-F      DT    0,2,4,5,7,9,11,13,14,16,18
        ,20,22,23,25,27,29
OF3F    1F202224262828292B2D2F31323436383A3B3D                        35250
                                           DT    31,32,34,36,38,40,41,43,45
        ,47,49,50,52,54,56,58,59,61
OF50    3F41434446484A4C4D4F51535556585A5C5E5F61                      35260
                                           DT    63,65,67,68,70,72,74,76,78
        ,79,81,83,85,86,88,90,92,94,95,97
OF64    00242627282A2B2C2D2E2F3132333536                              35270
                                 NITC     DT    0,36,38,39,40,42,43,44,45,
46,47,49,50,51,53,54
```

What is claimed is:

1. A heating system control device comprising:
   - means responsive to the dropping of the outside temperature to below a predetermined weatherhead set point for turning on a heating system to be controlled;
   - means for determining the establishment of heat in the heating system to be controlled;
   - means defining a heating cycle consisting of a heat-on portion and a heat-off portion having a duty cycle dependent on the outside temperature and starting in response to the establishment of heat in the heating system to be controlled; and
   - means for checking for heat loss in the system to be controlled and for delaying the start of a new heating cycle when heat is established until more heat is needed.

2. The device according to claim 1, wherein the means defining the heating cycle comprises an electronic clock, means for dividing each day into at least one first period and at least one second period and for storing the starting times for each period.

3. The device according to claim 2, wherein the means for turning on the system includes means for storing a first weatherhead set point for the at least one first period and a second weatherhead set point for the at least one second period.

4. The device according to claim 2, further comprising boosting means for turning on the heating system to be controlled for a predetermined duration prior to the earliest first period during each day.

5. The device according to claim 2, wherein the means defining the heating cycle includes means for setting a first general heating level for the at least one first period and a lower second general heating level for the at least one second period, whereby the duty cycles for the second period will be lower than that of the first period for the same outdoor temperature and means for setting a third minimum heat level for a 24-hour period.

6. The device according to claim 2, wherein the storing means includes means for storing the starting times of each period for each day of the week.

7. The device according to claim 2, further comprising means for substantially increasing the speed of the clock to substantially decrease the duration of the periods during a day to effect testing of the system being controlled.

8. The device according to claim 2, further automatic boosting means for turning on the heating system to be controlled for a variable duration prior to the earliest first period during each day comprising means for calculating the duration in response to the outside temperature.

9. The device according to claim 8, further comprising means for recording the duration of time the device is in the boost mode.

10. The device according to claim 2, further comprising automatic shutdown means for turning off the heating system to be controlled for a variable duration prior to the latest second period during each day as a function of the outside temperature.

11. The device according to claim 2, further comprising means for turning off the circulating pump of the heating system to be controlled during the second period, when the outside temperature rises a predetermined amount above the weatherhead set point and the heating system latent heat has been reduced to a predetermined amount.

12. The device according to claim 1, further comprising means for displaying when the system being controlled is being established or is established and is on or off.

13. The device according to claim 1, wherein the means defining the heating cycle further comprises means for setting the cycle time frequency.

14. The device according to claim 1, wherein the delay means comprises means for electrically adjusting the system heat loss differential indicative of when heat is needed to effect adjustment in the new cycle delay time.

15. The device according to claim 1, further comprising stoking means for turning on the heating system to be controlled for a predetermined time each day regardless of outside temperature.

* * * * *